(12) United States Patent
Ohta et al.

(10) Patent No.: US 10,075,913 B2
(45) Date of Patent: Sep. 11, 2018

(54) WIRELESS COMMUNICATION SYSTEM, MOBILE STATION, BASE STATION, AND WIRELESS COMMUNICATION SYSTEM CONTROL METHOD FOR REDUCING POWER CONSUMPTION

(71) Applicant: FUJITSU LIMITED, Kawasaki-shi, Kanagawa (JP)

(72) Inventors: Yoshiaki Ohta, Yokohama (JP); Yoshihiro Kawasaki, Kawasaki (JP); Yoshiharu Tajima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 103 days.

(21) Appl. No.: 14/226,306

(22) Filed: Mar. 26, 2014

(65) Prior Publication Data
US 2014/0204819 A1    Jul. 24, 2014

Related U.S. Application Data

(63) Continuation of application No. PCT/JP2011/072673, filed on Sep. 30, 2011.

(51) Int. Cl.
*H04W 52/02* (2009.01)
*H04L 5/00* (2006.01)
*H04L 1/00* (2006.01)
*H04W 72/08* (2009.01)

(52) U.S. Cl.
CPC ....... *H04W 52/0212* (2013.01); *H04L 1/0038* (2013.01); *H04L 5/0053* (2013.01);
(Continued)

(58) Field of Classification Search
CPC ............ H04W 52/0212; H04W 72/085; H04L 5/0053; H04L 1/0038; Y02B 60/50
See application file for complete search history.

(56) References Cited

U.S. PATENT DOCUMENTS

2004/0098495 A1* 5/2004 Warren et al. ................ 709/230
2006/0160558 A1* 7/2006 Kim et al. .................... 455/522
(Continued)

FOREIGN PATENT DOCUMENTS

JP   2011-066639    3/2011
WO  2009001594    12/2008
(Continued)

OTHER PUBLICATIONS

Blankenship et al., "Design on Enhanced Control Channel for Wireless System" U.S. Appl. No. 61/523,118, filed Aug. 2011.*
(Continued)

*Primary Examiner* — Ian N Moore
*Assistant Examiner* — Justin T Van Roie
(74) *Attorney, Agent, or Firm* — Westerman, Hattori, Daniels & Adrian, LLP

(57) ABSTRACT

A wireless communication system includes a mobile station and a base station. The base station includes a blind decoding control unit that transmits a signal including a control signal serving as a trigger to change a decoding process to the mobile station based on a result of measurement of the amount of data of the mobile station. The mobile station includes a blind decoding control unit that selects a signal format to be decoded upon reception of the control signal from the base station, and detects a control signal directed to the mobile station by decoding the signal having the selected format among signals received from the base station.

9 Claims, 17 Drawing Sheets

(52) U.S. Cl.
CPC ....... *H04W 72/085* (2013.01); *Y02D 70/1242* (2018.01); *Y02D 70/1262* (2018.01); *Y02D 70/1264* (2018.01); *Y02D 70/24* (2018.01)

(56) References Cited

U.S. PATENT DOCUMENTS

| | | | |
|---|---|---|---|
| 2010/0157927 | A1 | 6/2010 | Mochizuki et al. |
| 2010/0302983 | A1 | 12/2010 | McBeath et al. |
| 2011/0063975 | A1 | 3/2011 | Ohseki et al. |
| 2012/0046027 | A1* | 2/2012 | Baker et al. ............... 455/422.1 |
| 2012/0294213 | A1* | 11/2012 | Chen et al. ................... 370/311 |
| 2013/0039291 | A1* | 2/2013 | Blankenship ........... H04L 5/001 370/329 |
| 2013/0044706 | A1 | 2/2013 | Suzuki et al. |
| 2013/0343315 | A1* | 12/2013 | Tiirola .............. H04W 72/1231 370/329 |

FOREIGN PATENT DOCUMENTS

| | | | | |
|---|---|---|---|---|
| WO | | 2010125502 | A2 | 11/2010 |
| WO | WO 2011069378 | A1 * | 6/2011 | ............ H04W 28/08 |
| WO | | 2011108673 | | 9/2011 |

OTHER PUBLICATIONS

EESR—Extended/Supplementary European Search Report dated Aug. 14, 2014 for European Patent Application No. 11873413.6.

Panasonic, "DCI format and blind decoding for LTE-Advanced", 3GPP TSG-RAN WG1 Meeting #59, Jeju, Korea, Nov. 9-13, 2009, R1-094497, XP050388918.

3GPP TR 36.913 v9.0.0 "Requirements for further advancements for Evolved Universal Terrestrial Radio Access (E-UTRA) (LTE-Advanced)" (Release 9), Dec. 2009.

ETSI TR 136 912 V9.3.0 LTE; "Feasibility study for further advancements for E-UTRA (LTE-Advanced)" (3GPP TR 36.912 Release 9), Jun. 2010.

ETSI TS 136 321 V10.2.0 LTE; "Medium Access Control (MAC) protocol specification" (3GPP TS 36.321 Release 10), Jun. 2011.

ETSI TS 136 133 V10.3.0 LTE; "Requirements for support of radio resource management", (3GGP TS 36.133 Release 10), Jun. 2011.

ETSI TS 136 213 V10.2.0 LTE: "Physical layer procedures", (EGPP TS 36.213 Release 10), Jun. 2011.

ETSI TS 136 300 V10.4.0, "Evolved Universal Terrestrial Radio Access (E-UTRA) and Evolved Universal Terrestrial Radio Access Network (E-UTRAN)", (3GPP TS 36.300 Release 10), Jun. 2011.

International Search Report, mailed in connection with PCT/JP2011/072673 and dated Nov. 8, 2011.

CNOA—First Notification of Office Action dated Nov. 2, 2016 for Chinese Patent Application No. 201180073650.3, with English translation.

EPOA—Office Action of European Patent Application No. 11873413.6, dated Apr. 5, 2017.

\* cited by examiner

| SEARCH SPACE | AGGREGATION LEVEL | AGGREGATION SIZE | PDCCH CANDIDATE NUMBER |
|---|---|---|---|
| UNIQUE TO MOBILE STATION | 1 | 6 | 6 |
| | 2 | 12 | 6 |
| | 4 | 8 | 2 |
| | 8 | 16 | 2 |
| UNIQUE TO CELL | 4 | 16 | 4 |
| | 8 | 16 | 2 |

FIG.6

| | DIC FORMAT | #0 | #1 | #1A | #1B | #1C | #1D | #2 | #2A | #3 | #3A | #4 |
|---|---|---|---|---|---|---|---|---|---|---|---|---|
| 341 | DIC FORMAT | #0 | #1 | #1A | #1B | #1C | #1D | #2 | #2A | #3 | #3A | #4 |
| 342 | PAYLOAD SIZE | A | C | A | C | B | C | C | C | A | A | D |
| 343 | UNIQUE TO MOBILE STATION | ○ | ○ | ○ | ○ | | ○ | ○ | ○ | | | ○ |
| 344 | UNIQUE TO CELL | ○ | | ○ | | ○ | | | | ○ | ○ | |

FIG.7

| | | A | B | C | D | TOTAL |
|---|---|---|---|---|---|---|
| 351 | | A | B | C | D | TOTAL |
| 352 | UNIQUE TO MOBILE STATION | #0, #1A<br>6+6+2+2=16 | -<br>0 | #1, #1B, #1D, #2, #2A<br>6+6+2+2=16 | #4<br>6+6+2+2=16 | 48 |
| 353 | UNIQUE TO CELL | #0, #1A, #3, #3A<br>4+2=6 | #1C<br>4+2=6 | -<br>0 | -<br>0 | 12 |
| | | | | | | 60 |

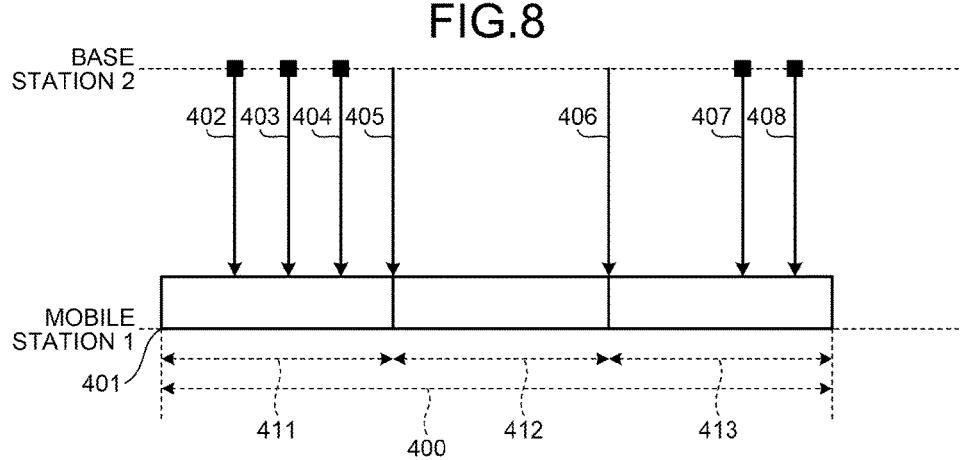
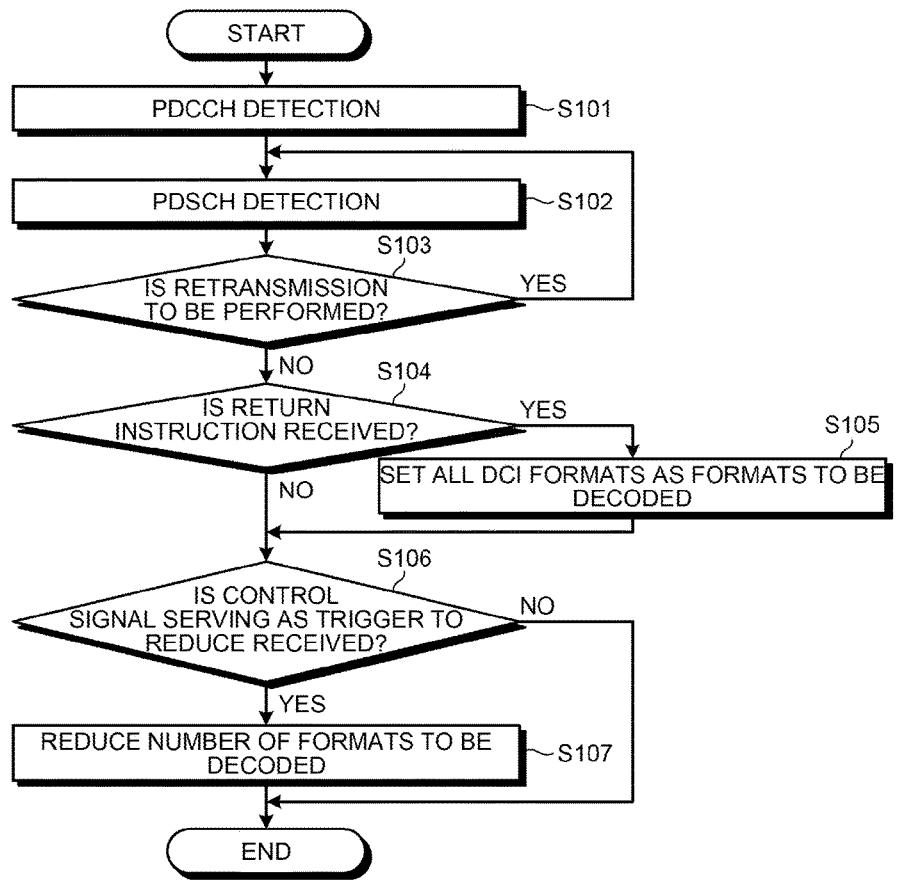

ns, mobile stations, base stations, and wireless com-
WIRELESS COMMUNICATION SYSTEM, MOBILE STATION, BASE STATION, AND WIRELESS COMMUNICATION SYSTEM CONTROL METHOD FOR REDUCING POWER CONSUMPTION This application is continuation application of International Application PCT/JP2011/072673 filed on Sep. 30, 2011 and designating the U.S., the entire contents of which are incorporated herein by reference.

FIELD

The present invention relates to wireless communication systems, mobile stations, base stations, and wireless communication system control methods.

BACKGROUND

In recent years, cellular mobile communications have advanced from UMTS (Universal Mobile Telecommunication System) to LTE (Long Term Evolution). In LTE, a method based on OFDM (Orthogonal Frequency Division Multiplexing) is specified as a wireless access technique, and high-speed wireless packet communications can be performed at a downlink peak transmission rate of 100 Mb/s or higher and at an uplink peak transmission rate of 50 Mb/s or higher. Furthermore, 3GPP (3rd Generation Partnership Project), which is an international standards organization, has started discussing LTE-A (LTE-Advanced) as a mobile communication system based on LTE, so as to realize even faster communications.

In LTE and LTE-A, DRX (Discontinuous Reception), which is a method for operating a mobile station in a power saving mode, may be used. DRX is now described in detail. In a mobile station, there are periods during which a monitoring of PDCCHs (Physical Downlink Data Channels) as L1 signals for controlling data transmission/reception is required, and there are periods during which the monitoring of PDCCHs is not required. Those periods are configured in cycles, and are called DRX cycles. Those cycles are not configured for each application, but are uniquely configured for each mobile station. In the periods during which PDCCHs is not required to be monitored, there is not required to perform signal processing such as data processing, and accordingly, a mobile station can enter a power saving mode. In the power saving mode, the mobile station suspends signal processing at its baseband unit, for example. The DRX cycles are configured by a base station notifying the mobile station of parameters or the like using an RRC (Radio Resource Control) signaling as an L3 signaling at the start of a communication. More specifically, the mobile station receives an RRC signaling that is a control signal, and configures DRX in accordance with DRX parameters transmitted through the RRC signaling. The start of DRX is specified by an SFN (System Frame Number) function. The other basic DRX parameters include OnDuration Timer. The period during which this timer is in operation is referred to as OnDuration, and a mobile station is unable to enter the power saving mode in this period. In a period during which this timer is not in operation, or in a period other than OnDuration, a mobile station can enter the power saving mode as specified.

Further, in LTE and LTE-A, two methods called DS (Dynamic Scheduling) and SPS (Semi-Persistent Scheduling) are specified as a data reception scheduling method. According to DS, radio resources being used by PDCCHs are indicated in both uplink and downlink communications, and PDSCHs (Physical Downlink Shared Channels) are transmitted as data with indicated parameters. According to SPS, on the other hand, a mobile station is notified of predetermined periods having predetermined transmission cycles before a communication is actually performed. When an SPS communication is performed, an activation command in a PDCCH is transmitted by the base station to notify the mobile station of which radio resources are continuously used, and the communication is then started. The base station also transmits a release command or the like in a PDCCH to the mobile station, to suspend a communication.

In LTE and LTE-A, blind decoding is performed on PDCCHs when PDCCHs are monitored. The base station assigns PDCCHs to radio resources called CCE (Control Channel Elements), and transmits the PDCCHs. The base station generates PDCCHs for each mobile station, and assigns the corresponding number of CCEs to the PDCCHs required in control information. The base station maps the control information defined by DCI (Downlink Control Information) formats on the physical resources corresponding to the assigned CCEs, and then transmits the control information. For example, in order to meet a reception quality requirement, an MCS (Modulation and Coding Scheme) having a low MCS level requires to be configured for a mobile station in a location with poor transmission channel quality such as a location near a cell boundary. In such a case, the base station transmits a PDCCH occupying a larger number of CCEs, such as eight CCEs. Meanwhile, even if an MCS having a high MCS level is configured for a mobile station in a location with excellent transmission channel quality such as a location near the center of a cell, it is possible to meet a reception quality requirement. Accordingly, the base station transmits a PDCCH occupying a smaller number of CCEs, such as one CCE. Further when mapping on physical resources is performed, mapping may be performed in regions unique to the cell or may be performed in regions unique to a mobile station, depending on the type of control information. Such regions in which PDCCHs are mapped on physical resources are called a search space.

The base station puts PDCCHs for respective mobile stations into one sub-frame, and simultaneously transmits the PDCCHs. Here, the number of CCEs occupied by the PDCCH for one mobile station is called an aggregation level, and the number of CCEs occupied by all PDCCHs is called an aggregation size. The base station does not notify mobile stations of which physical resources PDCCHs are mapped on. Therefore, each mobile station requires to determine whether a PDCCH directed to its own station is included in the sub-frame containing PDCCHs. This process is referred to as blind decoding. Specifically, a mobile station detects a PDCCH directed to its own station by detecting and decoding PDCCHs at each of the aggregation levels in each of the search spaces configure in the sub-frame. Such blind decoding is performed at the baseband unit of each mobile station, and therefore, the power of the mobile station is consumed. To reduce power consumption in the mobile station, it is preferable to reduce the number of times blind decoding is performed.

Meanwhile, there are an increasing number of mobile stations such as smartphones that execute a large number of applications. As intermittent traffics are generated from each application, there are traffics that characteristically appear to be continuous. Therefore, if a large number of applications intermittently generate data, the traffics appear to be continuous from the viewpoint of a mobile station. In a case where conventional DRX is used, a long OnDuration requires to be configured, and therefore, a mobile station is unable to enter the power saving mode. Further, in a mobile station, the periods for monitoring PDCCHs and the periods not for monitoring PDCCHs are configured simply in a regular pattern. Therefore, when PDCCHs are monitored in blind decoding, the maximum number of formats of PDCCHs are monitored. As a result, by a conventional method, monitoring of the maximum number of PDCCHs is continued over the periods during which the monitoring of PDCCHs is required.

In view of this, a technique for performing communications by switching between a communication using DS and a communication using SPS has been suggested as a conventional technique for efficiently assigning radio resources.
Patent Literature 1: Japanese Laid-open Patent Publication No. 2011-66639
Non-Patent Literature 1: 3GPP TR 36.913, "Requirements for further advancements for Evolved Universal Terrestrial Radio Access (E-UTRA) (LTE-Advanced)", V9.0.0, Release 9, December 2009.
Non-Patent Literature 2: 3GPP TR36.912, "Feasibility study for further advancements for E-UTRA (LTE-Advanced)", V9.3.0, Release 9, June 2010.
Non-Patent Literature 3: 3GPP TS36.321, "Medium Access Control (MAC) protocol specification", V10.2.0, Release 10, June 2011.
Non-Patent Literature 4: 3GPP TS36.133, "Requirements for support of radio resource management", V10.3.0, Release 10, June 2011.
Non-Patent Literature 5: 3GPP TS36.213, "Physical layer procedures", V10.2.0, Release 10, June 2011.
Non-Patent Literature 6: 3GPP TS36.300, "Evolved Universal Terrestrial Radio Access (E-UTRA) and Evolved Universal Terrestrial Radio Access Network (E-UTRAN)", V10.4.0, Release 10, June 2011.

SUMMARY

However, in a situation where PDCCHs are constantly monitored, it is difficult to avoid continuous monitoring of the maximum number of PDCCHs even with the conventional technique for performing communications by switching between a communication using DS and a communication using SPS. Therefore, it is difficult to reduce power consumption by the conventional technique.

According to an aspect of an embodiment, a wireless communication system includes a mobile station and a base station. The base station includes a control unit that transmits a signal including a control signal serving as a trigger to change a decoding process to the mobile station based on a result of measurement of a data amount of the mobile station, and the mobile station includes a decoding unit that selects a signal format to be decoded upon reception the control signal from the base station, and detects a control signal directed to its own device by decoding a signal having the selected format among signals received from the base station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a table showing the correspondence between respective DCI formats and search spaces.
FIG. 7 is a table for explaining the number of times blind decoding is performed.
FIG. 8 is a diagram for explaining transitions of the DCI formats to be decoded in the wireless communication system according to the first embodiment.
FIG. 9 is a flowchart of blind decoding control in the mobile station according to the first embodiment.

DESCRIPTION OF EMBODIMENTS

The following is a detailed description of embodiments of wireless communication systems, mobile stations, base stations, and wireless communication system control methods disclosed in this application, with reference to the accompanying drawings. It should be noted that the embodiments described below do not limit wireless communication systems, mobile stations, base stations, and wireless communication system control methods disclosed in this application.

First Embodiment

Figure 1:
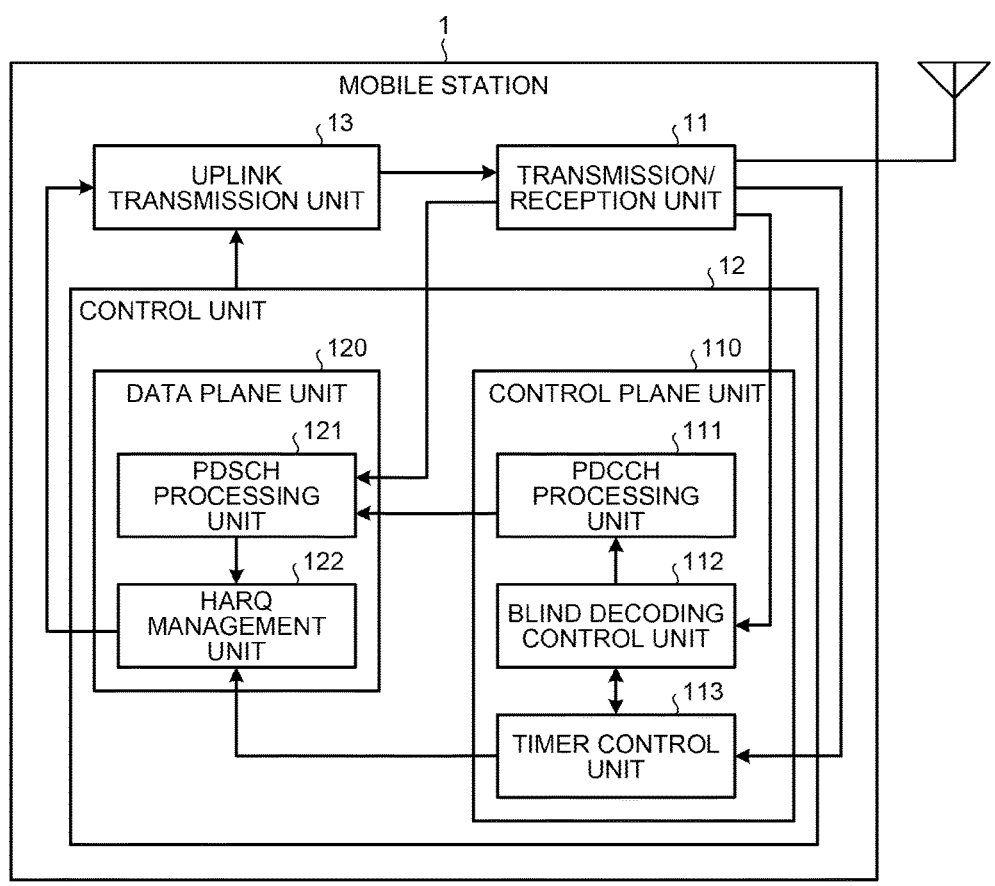
FIG. 1 is a block diagram of a mobile station according to a first embodiment.
Figure 2:
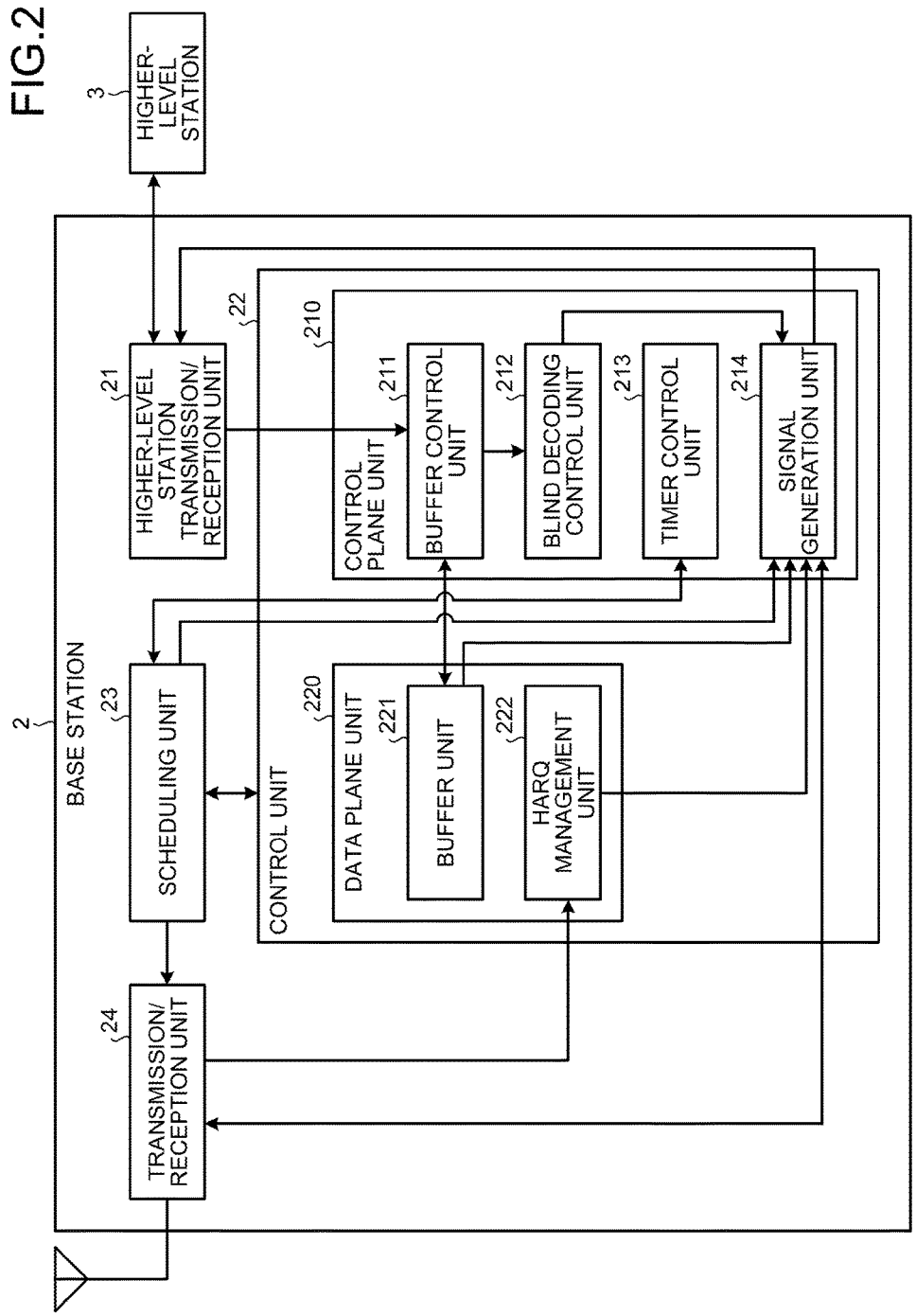
FIG. 2 is a block diagram of a base station according to the first embodiment.

FIG. 1 is a block diagram of a mobile station according to a first embodiment. FIG. 2 is a block diagram of a base station according to the first embodiment. In this embodiment, a mobile station 1 and a base station 2 perform communications using DS (Dynamic Scheduling).

As illustrated in FIG. 1, the mobile station 1 according to this embodiment includes a transmission/reception unit 11, a control unit 12, and an uplink transmission unit 13. Further, the control unit 12 includes a control plane unit 110 and a data plane unit 120. The control plane unit 110 includes a PDCCH (Physical Downlink Data Channel) processing unit 111, a blind decoding control unit 112, and a timer control unit 113. The data plane unit 120 includes a PDSCH (Physical Downlink Shared Channel) processing unit 121 and an HARQ (Hybrid Automatic Repeat Request) management unit 122.

The transmission/reception unit 11 transmits/receives radio signals to/from the later described base station 2 via an antenna. The transmission/reception unit 11 receives, from the base station 2, an RRC (Radio Resource Control) that is an L3 signaling as a control signaling to notify of DRX configuring conditions. The RRC contains DRX cycles, the conditions for activating timers, and the like. The transmission/reception unit 11 then transmits the received RRC to the timer control unit 113. The transmission/reception unit 11 also receives a signaling containing a PDCCH and a PDSCH from the base station 2. The transmission/reception unit 11 then outputs the received signaling to the blind decoding control unit 112 and the PDSCH processing unit 121.

The transmission/reception unit 11 further receives, from the base station 2, a signaling indicating that the buffer of the base station 2 is empty. In this embodiment, the transmission/reception unit 11 receives a notification of a buffer station indicator (hereinafter referred to as the "BSI")=0, which indicates that the buffer is empty, in the form of a flag that is 1-bit information added to the PDCCH having one of predetermined DCI formats. The DCI formats will be described later in detail. Here, any format may be used as the DCI format of the PDCCH for adding the flag indicating that the buffer of the base station 2 is empty. For example, a DCI format #1, #1A, #2, or #2A among the DCI formats described later is used in this embodiment. Upon reception of the information of BSI=0, the transmission/reception unit 11 outputs the information to the blind decoding control unit 112.

The transmission/reception unit 11 also receives a notification of downlink data re-arrival from the base station 2. In this embodiment, the transmission/reception unit 11 receives a notification of downlink data re-arrival by receiving a control signaling "Msg0" transmitted in the DCI format #1A. Here, Msg0 is a signaling that instructs the base station 2 to perform random access to the mobile station 1. Originally, the base station 2 transmits Msg0 to cause the mobile station 1 to perform random access so as to secure uplink synchronization of the mobile station 1 for reception of an ACK (ACKnowledgement)/NACK (Negative ACKnowledgement) from the mobile station 1 in response to downlink data. In this embodiment, however, Msg0 is reused as a control signaling for switching to regular PDCCH monitoring. In this case, random access is not perform, as long as uplink synchronization of the mobile station 1 has already been established. If uplink synchronization of the mobile station 1 has not been established, on the other hand, random access is performed. The transmission/reception unit 11 then notifies the blind decoding control unit 112 that Msg0 has been received from the base station 2.

The transmission/reception unit 11 also receives a NACK and other data from the uplink transmission unit 13. The transmission/reception unit 11 then transmits the NACK and the other data received from the uplink transmission unit 13 to the base station 2.

Figure 3:
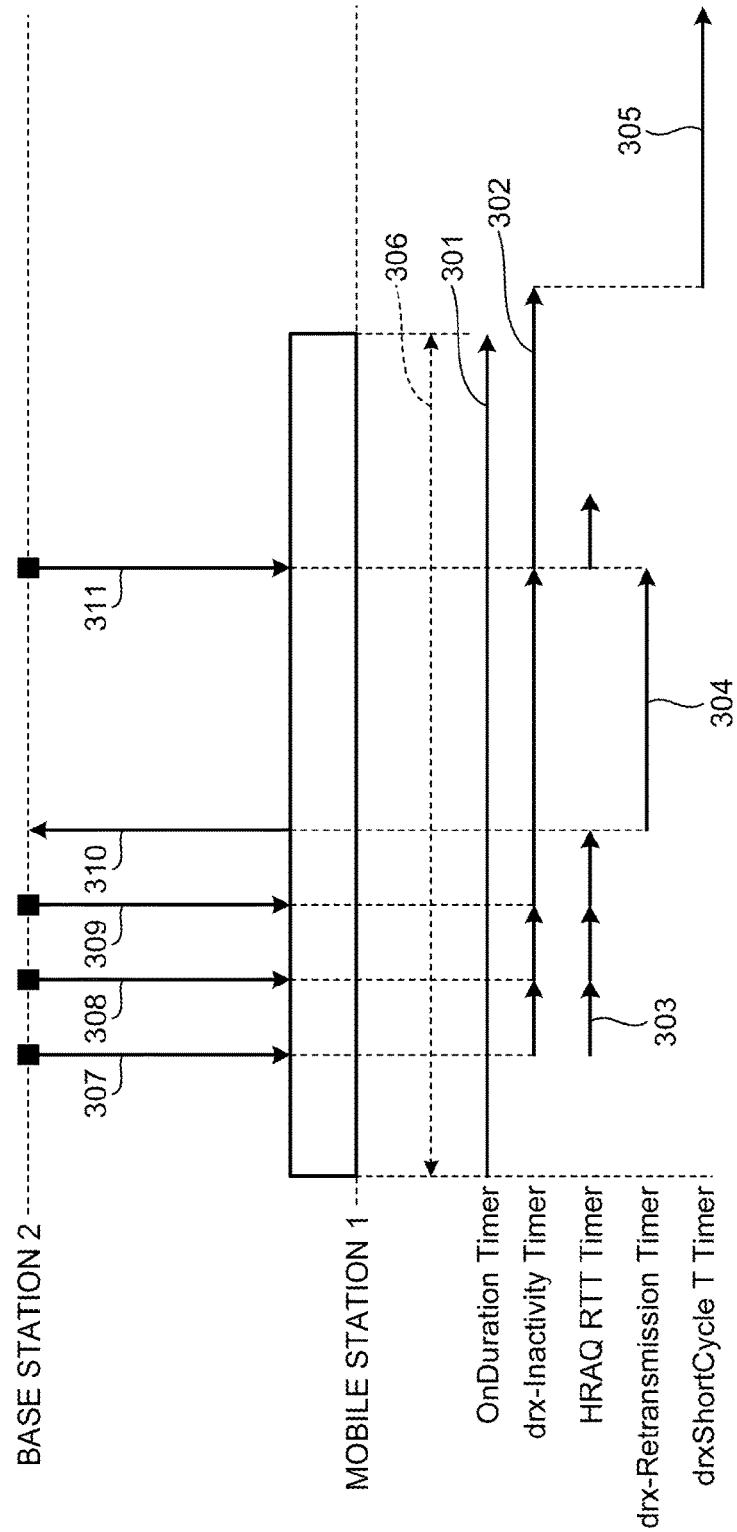
FIG. 3 is a diagram for explaining the timers in DRX.

The timer control unit 113 receives an input of an RRC from the transmission/reception unit 11. The timer control unit 113 then determines the time to start DRX from the DRX cycles and a function using an SFN (System Frame Number) and the identifier of its own device. The timer control unit 113 then notifies the PDCCH processing unit 111 and the blind decoding control unit 112 of the time to start DRX. Further, the timer control unit 113 activates the timers indicated by the RRC from the start sub-frame, and the respective timers measure times that are determined for the respective timers. The timer control unit 113 activates the timers illustrated in FIG. 3, for example. FIG. 3 is a diagram for explaining the timers in DRX. Data 307 through 309 and 311 are data that are transmitted from the base station 2 and contain PDCCHs. The data 309 is data that has failed to be received. A NACK 310 is a negative response for notifying that reception of the data 309 has failed. Further, the data 311 is the data 309 retransmitted by the base station 2 in response to the NACK 310.

As illustrated in FIG. 3, the timer control unit 113 activates an OnDuration Timer 301, a drx-Inactivity Timer 302, a HARQ RTT Timer 303, a drx-Retransmission Timer 304, and a drxShortCycle Timer 305. The OnDuration Timer 301 measures the period of OnDuration 306, during which reception of a PDCCH is required. That is, while the OnDuration Timer 301 is not running, or outside the OnDuration 306, monitoring PDCCHs is not required, and therefore, the mobile station 1 can switch to a power saving mode.

The drx-Inactivity Timer 302 is activated or re-activated upon reception of a PDCCH to notify of arrival (retransmission or exclusion) of new data. For example, upon reception of the data 307 through 309 and 311 containing PDCCHs from the base station 2, the drx-Inactivity Timer 302 is activated or re-activated. Therefore, even while the drx-Inactivity Timer 302 is in operation, monitoring PDCCHs is necessary, and the mobile station 1 is unable to switch to the power saving mode. That is, when the drx-Inactivity Timer 302 is operating outside the period of the OnDuration 306 as in the case illustrated in FIG. 3, the mobile station 1 is unable to switch to the power saving mode.

The HARQ RTT Timer 303 is activated or re-activated, regardless of whether the received data is new data or retransmitted data, and manages RTT (Round Trip Time) of HARQ for determining a data reception failure. When the HARQ RTT Timer 303 expires after the data 309 fails to be received, the mobile station 1 transmits the NACK 310 to the base station 2.

The drx-Retransmission Timer 304 is activated when data is not successfully received even though the HARQ RTT Timer 303 expires, and retransmission is performed while the timer is in operation. Monitoring PDCCHs is also necessary during this period, and therefore, the mobile station 1 is unable to switch to the power saving mode.

When the drx-Retransmission Timer 304 expires, the mobile station 1 switches to Short DRX if Short DRX has been configured. Here, Short DRX is an optional period that can be configured. During the Short DRX period, if data is received, the drx-Inactivity Timer 302 is activated so that the mobile station 1 immediately switches to the period during which monitoring PDCCHs is necessary. Accordingly, a lower delay is realized. The drxShortCycle Timer 305 is activated when the drx-Retransmission Timer 304 expires, and then manages the Short DRX period. When the drx-ShortCycle Timer 305 expires, the mobile station 1 switches directly to Long DRX. Long DRX is a period during which it is possible to switch to the power saving mode. If Short DRX has not been configured, the mobile station 1 switches directly to Long DRX. Specifically, when the timer control unit 113 confirms that the OnDuration Timer 301, the drx-Inactivity Timer 302, and the drx-Retransmission Timer 304 each have expired, the control unit 12 causes the mobile station 1 to switch to the power saving mode. The period during which any of the OnDuration Timer 301, the drx-Inactivity Timer 302, and the drx-Retransmission Timer 304 is in operation is referred to as "Active Time".

The timer control unit 113 notifies the HARQ management unit 122 of expiration of the HARQ RTT Timer 303 and start of the drx-Retransmission Timer 304.

The timer control unit 113 also notifies the blind decoding control unit 112 of expiration of the OnDuration Timer 301 and expiration of the drx-Inactivity Timer 302.

The blind decoding control unit 112 receives an input of a DRX start time from the timer control unit 113. The blind decoding control unit 112 then performs blind decoding on the PDCCHs of all the formats that have possibilities of reception at the received DRX start time. After performing the blind decoding and detecting a PDCCH directed to its own device, the blind decoding control unit 112 outputs the detected PDCCH to the PDCCH processing unit 111.

The blind decoding control unit 112 also receives, from the transmission/reception unit 11, a notification that the information BSI=0 has been received. Upon reception of the notification that the information BSI=0 has been received, the blind decoding control unit 112 performs blind decoding only on the PDCCHs of predetermined DCI formats to reduce the DCT format to be decoded. In this embodiment, only the formats 0, 1A, and 1C among the later described DCI formats are to be decoded. In this case, after performing the blind decoding and detecting a PDCCH directed to its own device, the blind decoding control unit 112 also outputs the detected PDCCH to the PDCCH processing unit 111.

To recognize which DCI formats are to be decoded, the blind decoding control unit 112 receives a notification through a signaling such as an RRC from the base station 2 prior to a start of communication. Also, to avoid a notification from the base station 2, only "0, 1A, and 1C" may be defined as the objects to be decoded in the blind decoding control unit 112 when the DCI formats to be decoded are limited.

Figures 4, 5:
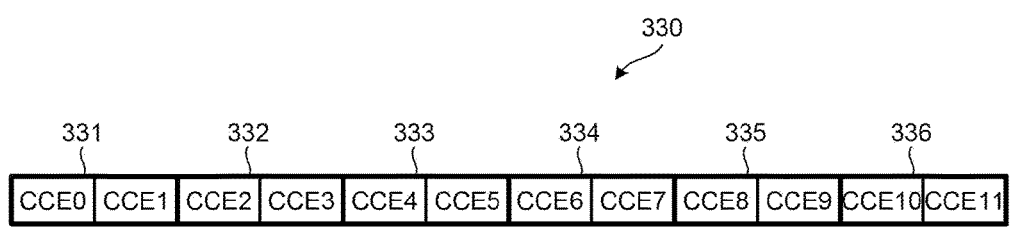
FIG. 4 is a table for explaining the number of PDCCH candidates.
FIG. 5 illustrates an example of PDCCH mapping.

Referring now to FIGS. 4 through 7, the PDCCH DCI formats and blind decoding are described. FIG. 4 is a table for explaining the number of PDCCH candidates. FIG. 5 illustrates an example of PDCCH mapping. FIG. 6 is a table showing the correspondence between the respective DCI formats and search spaces. FIG. 7 is a table for explaining the number of times blind decoding is performed.

A search space 321 in FIG. 4 shows the search spaces to be subjected to blind decoding. Specifically, the blind decoding control unit 112 performs blind decoding on the search spaces shown in the search space 321. An aggregation level 322 indicates the number of CCEs occupied by the PDCCH for the mobile station 1. For example, when the aggregation level 322 is 2, the PDCCH for the mobile station 1 occupies two CCEs. An aggregation size 323 indicates the number of CCEs occupied by all the PDCCHs contained in the signaling.

For example, in a case where an aggregation size 330 is 12 as in FIG. 5, PDCCHs 331 through 336 having the aggregation level 2 can be mapped in the aggregation size 330. That is, the six candidates of the PDCCH 331 through 336 can be selected as PDCCH candidates in the aggregation size 330.

However, the base station 2 does not notify the mobile station of a search space, an aggregation level, and an aggregation size. Therefore, the blind decoding control unit 112 repeatedly performs decoding on each search space while sequentially selecting each candidate at each aggregation level, so as to detect a PDCCH directed to its own device. For example, in the aggregation size 330 illustrated in FIG. 5, decoding is repeated while the PDCCHs 331 through 336 as the candidates for a PDCCH for its own device are sequentially selected. The process of sequentially repeating decoding on candidates that have possibilities of being a PDCCH for its own device is called blind decoding.

Referring back to FIG. 4, as for the number of PDCCH candidates to be decoded by the blind decoding control unit 112, a PDCCH candidate number 324 can be determined by dividing the aggregation size 323 by the aggregation level 322. For example, if the aggregation size 323 has 12 CCEs as in the aggregation size 330 illustrated in FIG. 5, and the aggregation level is 2, the PDCCH candidate number 324 can be determined by 12/2=6. The number determined in this manner is the PDCCH candidate number 324 corresponding to each set of the aggregation level 322 and the aggregation size 323 in FIG. 4.

In FIG. 6, a row 341 shows DCI formats, and a row 342 shows the payload sizes corresponding to the respective DCI formats. Further, rows 343 and 344 indicate in which search spaces the respective DCI formats might be mapped. As illustrated in FIG. 6, in LTE-A, for example, there are 11 kinds of DCI formats #0, #1, #1A, #1B, #1C, #1D, #2, #2A, #3, #3A, and #4.

The DCI format #0 has a payload size A, and can be mapped either in a search space unique to the mobile station or in a search space unique to the cell. The DCI format #1 has a payload size C, and can be mapped only in a search space unique to the mobile station. The DCI format #1A has the payload size A, and can be mapped either in a search space unique to the mobile station or in a search space unique to the cell. The DCI format #1B has the payload size C, and can be mapped only in a search space unique to the mobile station. The DCI format #1C has a payload size B, and can be mapped only in a search space unique to the cell. The DCI format #1D has the payload size C, and can be mapped only in a search space unique to the mobile station. The DCI format #2 has the payload size C, and can be mapped only in a search space unique to the mobile station. The DCI format #2A has the payload size C, and can be mapped only in a search space unique to the mobile station. The DCI format #3 has the payload size A, and can be mapped only in a search space unique to the cell. The DCI format #3A has the payload size A, and can be mapped only in a search space unique to the cell. The DCI format #4 has a payload size D, and can be mapped only in a search space unique to the mobile station.

The respective DCI formats are classified into four types (A through D) according to the payload size as in FIG. 6. Here, the blind decoding control unit 112 requires to perform decoding and detection on each of the formats to be decoded. However, as long as the payload size is the same, it is possible to determine to which format each PDCCH for its own device belongs through a single decoding process. Accordingly, the blind decoding control unit 112 can collectively perform decoding and detection on the PDCCHs of the formats having the same payload size. In FIG. 7, the formats are classified according to the payload sizes in each search space, and the number of PDCCH candidates in each format group is shown. A row 351 indicates the payload sizes. The upper half of the column corresponding to each payload size in a row 352 and a row 353 indicates the corresponding format(s), and the lower half indicates the number of PDCCH candidates. For example, the formats 0 and 1A belong to a group of the payload size A and are mapped in a search space unique to the mobile station, and the number of PDCCH candidates is 16. The formats 0, 1A, 3, and 3A belong to a group of the payload size A and are mapped in a search space unique to the cell, and the number of PDCCH candidates is 6. The total number of candidates in all the payload sizes is 48 in the search spaces unique to the mobile station, and is 12 in the search spaces unique to the cell, a grand total being 60. That is, the blind decoding control unit 112 can complete the decoding of the PDCCHs of all the formats by performing decoding 60 times at a maximum. Although an example case of LTE-A has been described above, an uplink MIMO is not set in the case of LTE, and therefore, there is not required to perform decoding on the DCI format 4. Accordingly, in the case of LTE, the decoding of the PDCCHs of all the formats can be completed by performing decoding 44 times at a maximum.

In a case where the number of the formats to be decoded is not reduced, the blind decoding control unit 112 performs decoding on the PDCCH of all the formats. Accordingly, the blind decoding control unit 112 performs decoding 60 times at a maximum in the case of LTE-A, and 44 times at a maximum in the case of LTE.

In a case where the number of formats to be decoded is reduced, on the other hand, decoding is not performed on the PDCCHs of formats not to be decoded. Accordingly, the blind decoding control unit 112 can reduce the number of decoding processes. In this embodiment, the formats to be decoded in the case where the number of formats to be decoded is reduced are the DCI formats #0, #1A, and #1C. Here, the DCI format #0 is a control signaling for transmission of a PUSCH (Physical Uplink Shared Channel). The DCI format #1A is a control signaling for an instruction to transmit a compact PDSCH and start random access. The DCI format #1C is a control signaling for transmission of an extremely compact PDSCH such as notification information. As the blind decoding control unit 112 receives the control signaling for PUSCH transmission, the mobile station 1 can transmit data from its own device. Also, by detecting the DCI format #1A, the blind decoding control unit 112 can acquire Msg0 for switching to the regular PDCCH monitoring. Also, as the blind decoding control unit 112 detects the DCI format #1C, the mobile station 1 can acquire notification information. This blind decoding control unit 112 is an example of the "decoding unit".

The PDCCH processing unit 111 receives a PDCCH for its own device from the blind decoding control unit 112. The PDCCH processing unit 111 then performs processing in accordance with the received PDCCH. In a case where the PDCCH is an instruction to receive a PDSCH, for example, the PDCCH processing unit 111 instructs the PDSCH processing unit 121 to receive a PDSCH from the transmission/reception unit 11 and perform processing. Other than that, uplink data transmission, processing in response to notification information, or the like is performed. This PDCCH processing unit 111 is an example of the "signal processing unit".

The PDSCH processing unit 121 receives, from the PDCCH processing unit 111, an instruction to receive a PDSCH from the transmission/reception unit 11 and perform processing. The PDSCH processing unit 121 then receives a PDSCH from the transmission/reception unit 11. The PDSCH processing unit 121 processes the received PDSCH, and transfers data to a higher-level layer such as MAC (Medium Access Control). The PDSCH processing unit 121 also notifies the HARQ management unit 122 of a processing result.

The HARQ management unit 122 receives a notification of expiration of the HARQ RTT Timer 303 and start of the drx-Retransmission Timer 304 from the timer control unit 113. The HARQ management unit 122 also receives a notification of a result of PDSCH processing performed by the PDSCH processing unit 121. As the HARQ RTT Timer 303 has expired and the drx-Retransmission Timer 304 has started, the HARQ management unit 122 notifies the uplink transmission unit 13 of an instruction to issue a retransmission request.

The control unit 12 processes the data processed by the PDSCH processing unit 121 in respective layers such as MAC, RLC, and PDCP, and provides the data to the user. The control unit 12 further processes audio data and the like input by the user in the respective layers, and transmits the processed data to the uplink transmission unit 13.

The uplink transmission unit 13 receives an instruction to issue a retransmission request from the HARQ management unit 122, generates a NACK, and transmits the generated NACK to the base station 2 via the transmission/reception unit 11. Upon reception of data that has been input by the user and been processed by the control unit 12, the uplink transmission unit 13 also transmits the data to the base station 2 via the transmission/reception unit 11.

As illustrated in FIG. 2, the base station 2 according to this embodiment includes a higher-level station transmission/reception unit 21, a control unit 22, a scheduling unit 23, and a transmission/reception unit 24. Further, the control unit 22 includes a control plane unit 210 and a data plane unit 220. The control plane unit 210 includes a buffer control unit 211, a blind decoding control unit 212, a timer control unit 213, and a signal generation unit 214. The base station 2 is connected to a upper-level station 3 via a network.

The higher-level station transmission/reception unit 21 transmits/receives data to/from the higher-level station 3 via a network. The higher-level station transmission/reception unit 21 outputs data received from the higher-level station 3 to the buffer control unit 211. The higher-level station transmission/reception unit 21 also receives data from the signal generation unit 214. The higher-level station transmission/reception unit 21 transmits the received data to the higher-level station 3.

The buffer control unit 211 receives an input of data from the higher-level station transmission/reception unit 21. The buffer control unit 211 then outputs a data storage instruction together with the data to a buffer unit 221.

The buffer control unit 211 also measures the amount of data accumulated in the buffer unit 221. The buffer control unit 211 then determines whether the buffer unit 221 is empty. When determining that the buffer unit 221 has become empty, the buffer control unit 211 notifies the blind decoding control unit 212 that the buffer unit 221 has become empty. When receiving an input of data from the higher-level station transmission/reception unit 21 while the buffer unit 221 is empty, the buffer control unit 211 notifies the blind decoding control unit 212 of re-arrival of downlink data. This buffer control unit 211 is an example of the "data amount measuring unit". Although an example case of downlink communication has been described above, the buffer unit 221 is also used in uplink communication. That is, the buffer unit 221 also analyzes a BSR (Buffer Status Reporting) transmitted from the mobile station 1, and measures the amount of data accumulated in the buffer of the mobile station 1.

The blind decoding control unit 212 receives, from the buffer control unit 211, a notification that the buffer unit 221 has become empty. The blind decoding control unit 212 then instructs the signal generation unit 214 to transmit a notification that the buffer has become empty. By issuing this instruction, the blind decoding control unit 212 can recognize that the mobile station 1 puts a limitation on the DCI formats to be decoded. Accordingly, the base station 2 checks with the blind decoding control unit 212 about the DCI formats to be decoded in the mobile station 1, and transmits PDCCHs having the other DCI formats.

The blind decoding control unit 212 also receives a notification of re-arrival of downlink data from the buffer control unit 211. The blind decoding control unit 212 then instructs the signal generation unit 214 to transmit a notification of re-arrival of downlink data. By issuing this instruction, the blind decoding control unit 212 can recognize that the mobile station 1 is to decode all kinds of DCI formats that have possibilities of reception. This blind decoding control unit 212 is an example of the "control unit".

The timer control unit 213 receives, from the scheduling unit 23, the DRX cycles of communication and the cycles of data transmission to be performed with the mobile station 1. The timer control unit 213 then notifies the scheduling unit 23 of the timing to transmit data. The timer control unit 213 also notifies the scheduling unit 23 of the timing of the DRX cycles.

The signal generation unit 214 receives, from the scheduling unit 23, the DRX cycles of communication to be performed with the mobile station 1. The signal generation unit 214 then generates an RRC signal containing the DRX cycles. The signal generation unit 214 then outputs the generated RRC signaling to the transmission/reception unit 24.

The signal generation unit 214 also generates a PDCCH that is a control signaling for controlling the mobile station 1. When data transmission is to be performed, the signal generation unit 214 acquires the data to be transmitted from the buffer unit 221, and generates a PDSCH. The signal generation unit 214 outputs the PDCCH to the transmission/reception unit 24. When data transmission is to be performed, the signal generation unit 214 also outputs the generated PDCCH with which by the PDSCH is associated to the transmission/reception unit 24.

The signal generation unit 214 also receives a retransmission request from a HARQ management unit 222. The signal generation unit 214 regenerates the data requested for retransmission. The signal generation unit 214 then outputs the generated signaling to the transmission/reception unit 24.

The signal generation unit 214 further receives, from the blind decoding control unit 212, an instruction to transmit a notification that the buffer has become empty. The signal generation unit 214 adds a flag indicating that the buffer has become empty to a PDCCH having a predetermined DCI format, and generates a signaling. The signal generation unit 214 then outputs the generated signaling having the flag added to the PDCCH, to the transmission/reception unit 24. Here, the PDCCH having the flag added thereto for transmission may be a PDCCH for notification after transmission of the last PDSCH before the buffer unit 221 becomes empty, or may be a PDCCH accompanying the last PDSCH transmission.

The signal generation unit 214 also receives, from the blind decoding control unit 212, an instruction to transmit a notification of re-arrival of downlink data. The signal generation unit 214 then generates a PDCCH of the DCI format #1A for transmitting a control signaling of Msg0, and outputs the PDCCH to the transmission/reception unit 24. Although a notification of re-arrival of downlink data is issued by transmitting Msg0 using the DCI format #1A in this embodiment, the signaling to be used in the notification is not limited to that. This signal generation unit 214 is an example of the "signal transmitting unit".

The buffer unit 221 receives an input of data and a data storage instruction from the buffer control unit 211. The buffer unit 221 stores and accumulates received data. The data accumulated in the buffer unit 221 is acquired by the signal generation unit 214, and therefore, gradually decreases.

The HARQ management unit 222 receives, from the transmission/reception unit 24, an input of a NACK transmitted from the mobile station 1. The HARQ management unit 222 notifies the signal generation unit 214 of a retransmission request for the data that has been transmitted immediately before the reception of the NACK.

The scheduling unit 23 stores the algorithm of wireless transmission scheduling. The scheduling unit 23 calculates DRX cycles and data transmission cycles for the mobile station 1 by using the stored algorithm. The scheduling unit 23 then transmits the calculated DRX cycles, data transmission cycles, and the like to the timer control unit 213. The scheduling unit 23 also notifies the signal generation unit 214 of the DRX cycles.

Based on the timing of the DRX cycles, the scheduling unit 23 instructs the transmission/reception unit 24 to start and end transmission of a signal containing a PDCCH.

The transmission/reception unit 24 transmits/receives radio signals to/from the mobile station 1 via an antenna. The transmission/reception unit 24 transmits an RRC signaling received from the signal generation unit 214 to the mobile station 1. The transmission/reception unit 24 also receives a notification of a start of transmission of a signaling containing a PDCCH from the scheduling unit 23. The transmission/reception unit 24 receives an input of the signaling containing a PDCCH from the signal generation unit 214. The signaling containing a PDCCH is then transmitted to the mobile station 1 at the time designated by the scheduling unit 23.

The transmission/reception unit 24 also receives data from the mobile station 1. The transmission/reception unit 24 then outputs the received data to the signal generation unit 214. The transmission/reception unit 24 also receives a NACK from the mobile station 1 via an antenna. In this case, the transmission/reception unit 24 outputs the received a NACK to the HARQ management unit 222.

Referring now to FIG. 8, transitions of the DCI formats to be decoded in the mobile station are described. FIG. 8 is a diagram for explaining transitions of the DCI formats to be decoded in the wireless communication system according to the first embodiment. In FIG. 8, the direction from left to right indicates the time elapsed. A period 400 in FIG. 8 indicates the "Active Time".

Time 401 is the time to start DRX, which is calculated by the timer control unit 113 using a function of common information such as an SFN and the identifier of its own device. At time 401, the mobile station 1 starts decoding PDCCHs of all the DCI formats having possibilities of reception and detecting a PDCCH for its own device. In a case where UL MIMO has not been set, for example, the mobile station 1 may not perform blind decoding on the DCI format(s) related to UL MIMO, since there is no possibility of receiving the DCI format #4. Thereafter the base station 2 sequentially transmits data 402 through 404 containing PDCCHs. The mobile station 1 sequentially receives and decodes the data 402 through 404 transmitted from the base station 2, detects a PDCCH for its own device, and processes respective data in accordance with the detected PDCCH.

Here, an example case where the buffer of the base station 2 becomes empty due to transmission of the data 404 is described. In this case, the DCI format #1 is used as the predetermined DCI format for notifying that the BSI is 0. The base station 2 transmits a signal 405 generated by adding a "BSI=0" flag to a PDCCH having the DCI format #1, to the mobile station 1.

After receiving the signal 405, the mobile station 1 performs decoding and detects a PDCCH for its own device. The mobile station 1 then confirms that the flag indicating BSI=0 is added to the detected PDCCH, and limits the DCI formats to be decoded to the DCI formats #0, #1A, and #1C.

After that, the base station 2 receives the data to be transmitted to the mobile station 1 from the higher-level station 3, and transmits a signal 406 containing a PDCCH of the DCI format #1A containing Msg0 to the mobile station 1.

Since the DCI format #1A is included among the objects to be decoded, the mobile station 1 can detect a PDCCH by decoding the signaling containing Msg0. Upon reception of the signal 406 for notifying of Msg0, the mobile station 1 returns to the state where all formats of DCI formats having possibilities of reception are to be decoded. The base station 2 then transmits data 407 and 408 containing PDCCHs to the mobile station 1. The mobile station 1 receives and decodes the data 407 and 408 transmitted from the base station 2, detects a PDCCH for its own device, and processes data in accordance with the detected PDCCH.

In view of the above, the mobile station 1 performs decoding 60 times at a maximum in a period 411 and a period 413 in the case of LTE-A. Meanwhile, in a period 412, the mobile station 1 performs decoding 28 times at a maximum. Accordingly, the number of times decoding is performed in blind decoding and power consumption can be made smaller than those in a case where blind decoding is continued by performing decoding 60 times at a maximum in the entire "Active Time" period 400. Also, power can be saved independently of the respective timers that define the "Active Time". Accordingly, even in a case where the mobile station is unable to switch to a power saving mode due to running a plurality of applications, power consumption can be reduced in the mobile station.

Referring now to FIG. 9, a flow of blind decoding control in the mobile station according to this embodiment is described. FIG. 9 is a flowchart of the blind decoding control in the mobile station according to the first embodiment.

The transmission/reception unit 11 receives data containing PDCCHs from the base station 2, and transmits the received data to the blind decoding control unit 112. The blind decoding control unit 112 decodes the PDCCHs having the DCI formats to be decoded among the received signals, and detects a PDCCH for its own device (step S101).

The PDCCH processing unit 111 receives the PDCCH detected by the blind decoding control unit 112, and instructs the PDSCH processing unit 121 to process a PDSCH in accordance with the received PDCCH. The PDSCH processing unit 121 receives a PDSCH from the transmission/reception unit 11, performs decoding, and detects and processes the PDSCH (step S102).

The HARQ management unit 122 receives a PDSCH processing result from the PDSCH processing unit 121. The HARQ management unit 122 determines whether the received data requires to be retransmitted (step S103). If retransmission is necessary (Yes in step S103), the HARQ management unit 122 issues a NACK transmission instruction to the uplink transmission unit 13, and returns to step S102.

If retransmission is not necessary (No in step S103), on the other hand, the blind decoding control unit 112 determines whether "Msg0", or a control signaling serving as a trigger to return to the regular blind decoding to be performed on all the DCI formats having possibilities of reception, has been received (step S104). If the control signaling has been received (Yes in step S104), the blind decoding control unit 112 changes the objects to be decoded to all the DCI formats having possibilities of reception (step S105). If the control signaling has not been received (No in step S104), on the other hand, the blind decoding control unit 112 moves on to step S106.

The blind decoding control unit 112 then determines whether the BSI is 0 or whether a control signaling serving as a trigger to limit the objects to be decoded only to predetermined kinds of DCI formats and reduce the DCI formats to be decoded has been received (step S106). If the control signaling has been received (Yes in step S106), the blind decoding control unit 112 reduces the DCI formats to be decoded to the DCI formats #0, #1A, and #1C of the predetermined kinds (step S107). If the control signaling has not been received (No in step S106), on the other hand, the mobile station 1 ends the blind decoding control process.

Although a flow of a single blind decoding control process has been described with reference to FIG. 9, the mobile station 1 repeats the process illustrated in FIG. 9 during the "Active Time" period.

Figure 10:
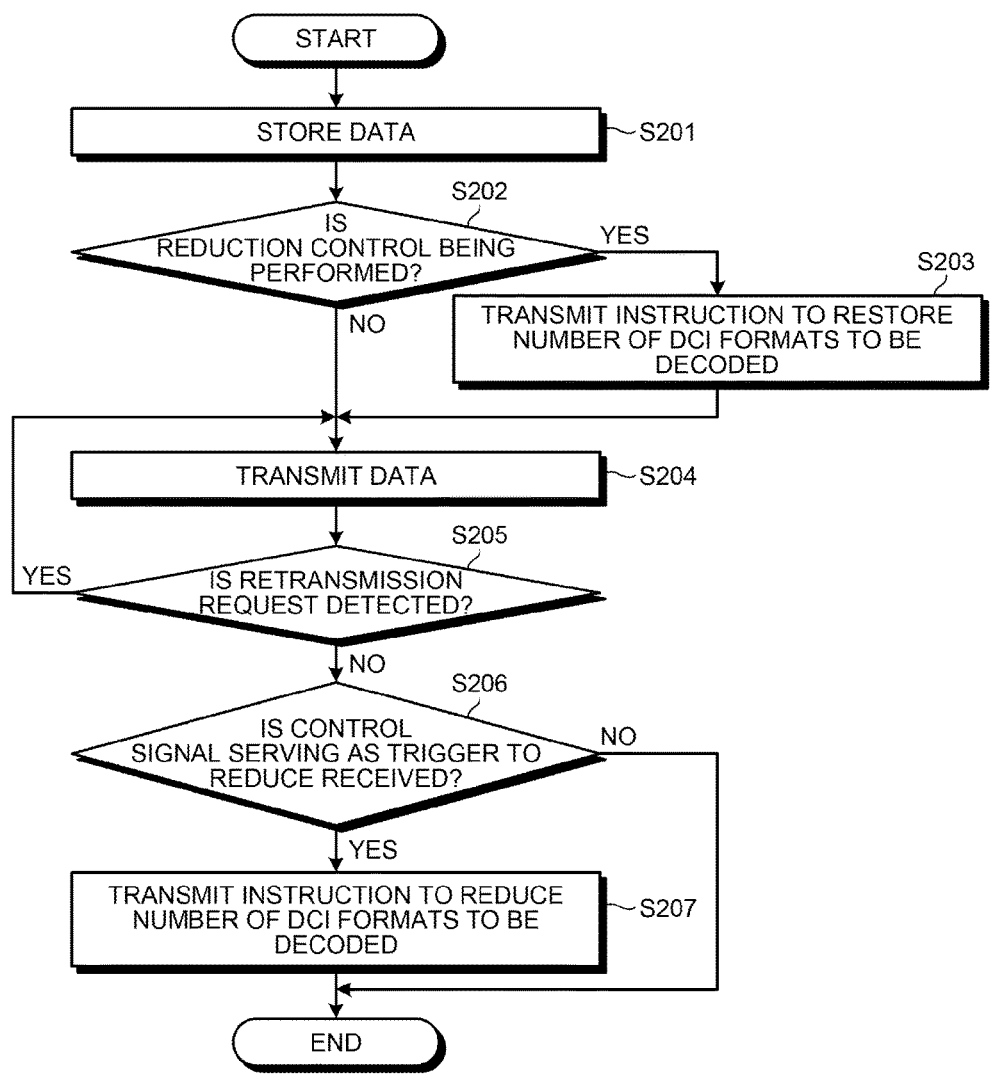
FIG. 10 is a flowchart of blind decoding control in the base station according to the first embodiment.

Referring now to FIG. 10, a flow of blind decoding control in the base station 2 according to this embodiment is described. FIG. 10 is a flowchart of blind decoding control in the base station according to the first embodiment.

The higher-level station transmission/reception unit 21 receives downlink data transmitted from the higher-level station 3 toward the mobile station 1. The buffer control unit 211 acquires the downlink data for the mobile station 1 from the upper-level station transmission/reception unit 21. Further, the buffer unit 221 stores the downlink data for the mobile station 1 in accordance with an instruction from the buffer control unit 211 (step S201).

Upon reception of a notification of arrival of the downlink data from the buffer control unit 211, the blind decoding control unit 212 determines whether reduction control is being performed to reduce the DCI formats to be subjected to blind decoding in the mobile station 1 to predetermined kinds of DCI formats (step S202). If the reduction control is being performed (Yes in step S202), the blind decoding control unit 212 notifies the signal generation unit 214 of the arrival of the downlink data. The signal generation unit 214 then creates a PDCCH containing Msg0 serving as a trigger to restore the DCI formats to be decoded to all kinds of DCI formats having possibilities of reception, and transmits the created PDCCH to the mobile station 1 via the transmission/reception unit 24 (step S203). If the reduction control is not being performed (No in step S202), on the other hand, the blind decoding control unit 212 moves on to step S204.

The signal generation unit 214 then acquires data to be transmitted from the data accumulated in the buffer unit 221, and creates data containing PDCCHs and PDSCHs. The signal generation unit 214 then transmits the generated data to the mobile station 1 via the transmission/reception unit 24 (step S204).

The HARQ management unit 222 detects a retransmission request in accordance with a NACK from the mobile station 1 (step S205). If a retransmission request is detected (Yes in step S205), the HARQ management unit 222 instructs the signal generation unit 214 to retransmit the data that has failed to be transmitted, and returns to step S204.

If a retransmission request is not detected (No in step S205), on the other hand, the buffer control unit 211 acquires the amount of the data accumulated in the buffer unit 221. Based on whether the buffer unit 221 is empty, the buffer control unit 211 determines whether the control signaling serving as the trigger to reduce the kinds of DCI formats to be decoded in the mobile station 1 requires being transmitted (step S206). If the control signaling is necessary (Yes in step S206), the blind decoding control unit 212 instructs the signal generation unit 214 to notify the mobile station 1 that the buffer is empty. In accordance with the instruction from the blind decoding control unit 212, the signal generation unit 214 generates a signaling by adding a flag notifying that the buffer is empty to a PDCCH having a predetermined DCI format. After that, the signal generation unit 214 transmits the generated signaling to the mobile station 1 (step S207). If the control signaling is not necessary (No in step S206), on the other hand, the base station 2 ends the blind decoding control process.

Although a flow of a single blind decoding control process has been described with reference to FIG. 10, the base station 2 repeats the process illustrated in FIG. 10 during the "Active Time" period.

As described above, the wireless communication system according to this embodiment can reduce the DCI formats to be decoded in the mobile station during the period from the time when the buffer of the base station becomes empty to the time when downlink data again arrives in the "Active Time" period. In other words, the number of decoding processes to be performed in the blind decoding of PDCCHs while DRX is ON can be reduced. Accordingly, the mobile station can reduce its power consumption. Also, power can be saved independently of the respective timers that define the "Active Time". Accordingly, even in a case where the mobile station is unable to switch to a power saving mode due to running applications, power consumption can be reduced in the mobile station.

(Modification 1-1)

In the first embodiment, the DCI formats #0, #1A, and #1C are the formats to be decoded in a case where the objects to be decoded are limited to predetermined DCI formats. However, the objects to be decoded are not limited to those DCI formats, as long as notification information and the control signaling serving as the trigger to restore the objects to be decoded to all the DCI formats having possibilities of reception can be obtained.

For example, only the DCI formats #1A and #1C may be configured as the DCI formats to be decoded. In this case, a return instruction can be acquired, as Msg0 is transmitted in the DCI format #1A as in the first embodiment. Also, notification information can be acquired from the DCI format #1C. In this case, a return to blind decoding is not carried out even when a PDCCH for uplink data transmission is received, which differs from the first embodiment. In a case where the DCI format #0 is not monitored, the base station 2 preferably recognizes that uplink data to be transmitted by the mobile station 1 has not been generated. To do so, the base station 2 measures the amount of the data accumulated in the buffer of the mobile station 1 through a BSR (Buffer Status Reporting) transmitted from the mobile station 1. If a result of the reception of the BSR indicates that there is no uplink data in the mobile station 1, the DCI format #0 may not be configured as an object to be decoded. If uplink data arrives at the mobile station 1, on the other hand, the DCI format #0 is preferably configured as an object to be decoded. In view of this, when an SR (Scheduling Request) transmitted upon arrival of uplink data at the mobile station 1 is received, the DCI format #0 is configured as an object to be decoded, with the reception being the trigger.

In a case where only PDCCHs having the DCI formats #1A and #1C are configured as the objects to be decoded, the maximum number of times decoding is performed is the same as that in the first embodiment, and furthermore, the number of formats to be detected decreases from three to two. Accordingly, misdetection rate can be lowered.

In the first embodiment, to notify that the BSI is 0, a flag is added to a PDCCH of a predetermined DCI format. However, any method may be used to notify that the BSI is 0, as long as the mobile station 1 can recognize that the BSI is 0. In the modifications 1-2 through 1-4 described below, methods of notifying that the BSI is 0 in this modification are described as other example methods.

(Modification 1-2)

Upon reception of a notification of BSI=0 from the blind decoding control unit 212, the signal generation unit 214 creates a signaling by specifying assignment of zero to a PDSCH region in a PDCCH. Here, assignment of zero means that nothing is assigned to the PDSCH region. In this case, no PDSCH accompanies the PDCCH. The signal generation unit 214 then transmits the PDCCH having zero assigned to the PDSCH region to the mobile station 1 via the transmission/reception unit 24.

The blind decoding control unit 112 receives the PDCCH having zero assigned to the PDSCH region. Normally, assignment to a PDSCH is finite. However, as the assignment of zero is specified, the blind decoding control unit 112 recognizes that the BSI is 0 in the base station 2 through the reception of the PDCCH having zero assigned to the PDSCH region.

As described above, by specifying assignment of zero to the PDSCH region, the base station 2 can notify the mobile station 1 that the BSI is 0.

(Modification 1-3)

Upon reception of a notification of BSI=0 from the blind decoding control unit 212, the signal generation unit 214 creates a signaling to notify the mobile station 1 that the BSI is 0 by using a MAC CE (MAC Control Element) that is a control signaling of the MAC layer. Here, the MAC CE may be transmitted independently, or may attach the MAC CE to a PDSCH that is the last data transmitted before the buffer becomes empty.

The blind decoding control unit 112 receives the MAC CE. Having received the MAC CE, the blind decoding control unit 112 recognizes that the BSI is 0 in the base station 2.

As described above, the base station 2 can also notify the mobile station 1 that the BSI is 0 by using a signaling of the MAC layer.

(Modification 1-4)

Upon reception of a notification of BSI=0 from the blind decoding control unit 212, the signal generation unit 214 adds extra data as a padding to a PDSCH that is the last data transmitted before the buffer becomes empty. The PDSCH with which by the padding is associated then transmitted.

The blind decoding control unit 112 recognizes that the BSI is 0 in the base station 2 when correctly receiving the PDSCH with which accompanied by the padding is associated or when retransmission is completed.

As described above, the base station 2 can also notify the mobile station 1 that the BSI is 0 by using a signaling having a padding added to a PDSCH.

As described above in the modifications 1-2 through 1-4, any notification method may be used as long as the mobile station 1 can recognize that the BSI is 0.

Although example cases of DRX have been described above, the above described functions can be executed in any other cases as long as blind decoding is performed during a predetermined period, and the effect to reduce power consumption can be achieved.

Second Embodiment

A wireless communication system according to this embodiment differs from the above described embodiment and modifications in that the wireless communication system enters an energy saving mode (hereinafter referred to as the "ES (Energy Saving) mode") when the buffer of the base station 2 becomes empty. Therefore, a notification of a transition to the ES mode is mainly described below. The mobile station and the base station according to this embodiment are also illustrated in the block diagrams in FIGS. 1 and 2. Explanation of the same configurations and actions of each unit as those of the above described embodiment and modifications is not repeated below.

When all the data accumulated in the buffer unit 221 has been transmitted and no data is left therein, the signal generation unit 214 in the base station 2 receives a notification of BSI=0 from the blind decoding control unit 212. The signal generation unit 214 then generates a signaling by adding a flag indicating a transition to the ES mode to a PDCCH of a predetermined DCI format. The signal generation unit 214 then transmits the signaling containing the PDCCH including the flag indicating a transition to the ES mode, to the mobile station 1. The PDCCH including the flag may be transmitted after the PDSCH as the last data is transmitted, or the flag may be attached to the PDCCH with which the last PDSCH is associated when the last PDSCH is transmitted.

The blind decoding control unit 112 of the mobile station 1 then receives the PDCCH including the flag indicating a transition to the ES mode from the base station 2 via the transmission/reception unit 11. Upon reception of the instruction of a transition to the ES mode, the blind decoding control unit 112 limits the DCI formats to be decoded to predetermined kinds that are the DCI formats #0, #1A, and #1C in this embodiment, for example.

Figure 11:
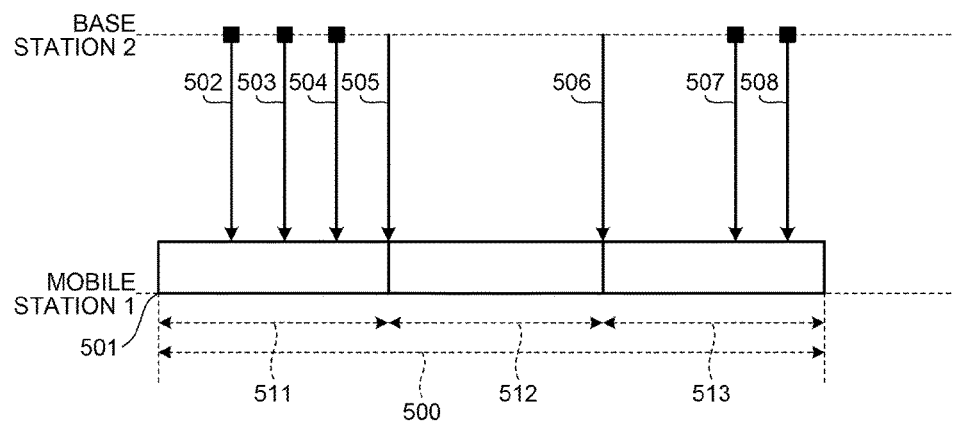
FIG. 11 is a diagram for explaining transitions of the DCI formats to be decoded in a wireless communication system according to a second embodiment.

Referring now to FIG. 11, transitions of the DCI formats to be decoded in the wireless communication system according to this embodiment are described. FIG. 11 is a diagram for explaining transitions of the DCI formats to be decoded in the wireless communication system according to the second embodiment.

At time 501, the mobile station 1 starts decoding PDCCHs of all the DCI formats having possibilities of reception and detecting a PDCCH for its own device. The base station 2 sequentially transmits data 502 through 504 containing PDCCHs. The mobile station 1 sequentially receives and decodes the data 502 through 504 transmitted from the base station 2, detects a PDCCH for its own device, and processes respective data in accordance with the detected PDCCH.

Here, an example case where the buffer of the base station 2 becomes empty due to transmission of the data 504 is described. In this case, the DCI format #1 is used as the DCI format for notifying of a transition to the ES mode. The base station 2 transmits a signaling 505 having an ES-mode indicating flag added to a PDCCH having the DCI format #1, to the mobile station 1.

The mobile station 1 receives and decodes the signaling 505, and detects a PDCCH for its own device. The mobile station 1 then confirms that the flag indicating a transition to the ES mode is added to the detected PDCCH, and limits the DCI formats to be decoded to the DCI formats #0, #1A, and #1C.

After that, the base station 2 receives the data to be transmitted to the mobile station 1 from the upper-level station 3, and transmits a signaling 506 containing a PDCCH of the DCI format #1A containing Msg0 to the mobile station 1.

Since the DCI format #1A is included among the objects to be decoded, the mobile station 1 can detect a PDCCH by decoding the signaling containing Msg0. Upon reception of the signaling 506 notifying of Msg0, the mobile station 1 restores the DCI formats to be decoded to the regular DCI formats. The base station 2 then transmits data 507 and 508 containing PDCCHs to the mobile station 1. The mobile station 1 receives and decodes the data 507 and 508 transmitted from the base station 2, detects a PDCCH for its own device, and processes data in accordance with the detected PDCCH.

In view of the above, the mobile station 1 performs decoding 60 times at a maximum in a period 511 and a period 513 in the case of LTE-A. Meanwhile, in a period 512, the mobile station 1 performs decoding 28 times at a maximum. Accordingly, the number of times decoding is performed in blind decoding and power consumption can be made smaller than those in a case where blind decoding is continued by performing decoding 60 times at a maximum in the entire "Active Time" period 500. Also, power can be saved independently of the respective timers that define the "Active Time". Accordingly, even in a case where the mobile station is unable to switch to a power saving mode due to running a plurality of applications, power consumption can be reduced in the mobile station.

As described above, in the wireless communication system according to this embodiment, a notification of a transition to the ES mode is transmitted so as to put a limitation on the DCI formats to be decoded. Accordingly, the number of times decoding is performed in blind decoding of PDCCHs during the "Active Time" period or while DRX is ON can be reduced in the wireless communication system according to this embodiment. In this manner, processing in the mobile station can be reduced, and power consumption can be lowered accordingly.

In the second embodiment, to notify that the BSI is 0, a flag for notifying of a transition to the ES mode is added to a PDCCH of a predetermined DCI format. However, any method may be used to notify that the BSI is 0, as long as the mobile station 1 can recognize that the BSI is 0. In view of this, a method of notifying that the BSI is 0 in this embodiment is described below as an example of other methods.

(Modification 2)

Upon reception of a notification of BSI=0 from the blind decoding control unit 212, the signal generation unit 214 creates a signaling to notify the mobile station 1 of a transition to the ES mode by using a MAC CE. Here, the MAC CE may be transmitted independently, or may be associated with a PDSCH that is the last data transmitted before the buffer becomes empty.

The blind decoding control unit 112 receives the MAC CE. The blind decoding control unit 112 then acquires an instruction of a transition to the ES mode from the received MAC CE. The blind decoding control unit 112 then puts a limitation on the DCI formats to be decoded.

As described above, the base station 2 can also notify the mobile station 1 of a transition to the ES mode by using a signaling of the MAC layer.

Although example cases of DRX have been described above, the above described functions can be executed in any other cases as long as blind decoding is performed during a predetermined period, and the effect to reduce power consumption can be achieved.

Third Embodiment

A wireless communication system according to this embodiment differs from the above described embodiments and modifications in that a notification of a limitation on the DCI formats to be decoded is issued before the buffer of the base station 2 becomes empty, and the mobile station 1 puts a limitation on the DCI formats to be decoded when the timer expires after the notification is received. Therefore, the notification of a limitation on the DCI formats to be decoded and the limiting action are mainly described below. The mobile station and the base station according to this embodiment are also illustrated in the block diagrams in FIGS. 1 and 2. Explanation of the same configurations and actions of each unit as those of the above described embodiments and modifications is not repeated below.

The buffer control unit 211 acquires, from the buffer unit 221, an amount of data (or the BSI: Buffer Status Indicator) of the downlink data accumulated in the buffer unit 221. The buffer control unit 211 then outputs the acquired amount of data to the blind decoding control unit 212. This amount of data is represented by the number of remaining packets, for example.

The blind decoding control unit 212 acquires the amount of data from the buffer control unit 211. The blind decoding control unit 212 then notifies the signal generation unit 214 of amount of data at predetermined intervals. In this embodiment, the blind decoding control unit 212 outputs the notification every 100 ms, for example.

The signal generation unit 214 notifies the mobile station of the value of the timer beforehand by using RRC. The signal generation unit 214 receives the notification of the amount of data from the blind decoding control unit 212. The signal generation unit 214 then creates a signaling for notifying the mobile station 1 of the amount of data by using a MAC CE. The signal generation unit 214 transmits the created signaling to the mobile station 1 via the transmission/reception unit 24. Here, transmitting a MAC CE is preferable, since the information amount of a BSI is large. The signal generation unit 214 may attach the MAC CE to the PDSCH to be transmitted, or may transmit the MAC CE independently of the PDSCH.

The blind decoding control unit 112 of the mobile station 1 stores beforehand a threshold value of the amount of data for activating the control timer that measures the time to put a limitation on the DCI formats to be decoded. For example, the blind decoding control unit 112 stores 10 packets as the threshold value in this embodiment.

The blind decoding control unit 112 then receives the MAC CE containing the information about the amount of data via the transmission/reception unit 11. The blind decoding control unit 112 then acquires the information about the amount of data from the received MAC CE. Further, the blind decoding control unit 112 determines whether the acquired amount of data is equal to or less than 10 packets. If the acquired amount of data is equal to or less than 10 packets, the blind decoding control unit 112 instructs the timer control unit 113 to activate the control timer. The blind decoding control unit 112 then receives a notification of expiration of the control timer from the timer control unit 113. The blind decoding control unit 112 then limits the DCI formats to be subjected to blind decoding to the DCI formats #0, #1A, and #1C, for example.

The timer control unit 113 acquires the value of the timer beforehand from the RRC. The timer control unit 113 receives the timer activation instruction from the blind decoding control unit 112. The timer control unit 113 then activates the timer, and counts up to the notified timer value. When the timer expires, the timer control unit 113 notifies the blind decoding control unit 112 of expiration of the timer.

Here, the control timer may be a drx-Inactivity Timer that is a DRX parameter, or may be a new timer.

The operation in relation to the drx-Inactivity Timer in a case where a new timer is used as the control timer is described. For example, if the control timer has not yet expired though the drx-Inactivity Timer has expired, the operation transits to Short DRX or Long DRX and enters a mode in which PDCCH decoding and detection are not necessary, as specified for the drx-Inactivity Timer. In this case, the blind decoding control unit 112 may not perform PDCCH decoding and detection at all, or may limit the objects to be decoded to the PDCCHs having predetermined kinds of DCI formats if performing PDCCH decoding and detection. If the control timer has expired though the drx-Inactivity Timer has not yet expired, on the other hand, the blind decoding control unit 112 limits the objects to be decoded to the PDCCHs having the predetermined kinds of DCI formats.

In the above description, the blind decoding control unit 112 of the mobile station 1 determines whether to put a limitation on the DCI formats to be subjected to blind decoding by using an amount of data n. However, this determination may be performed in the base station 2. For example, the blind decoding control unit 212 of the base station 2 stores a threshold value of the amount of data for determining whether to activate the control timer in the mobile station 1. When the amount of data obtained from the buffer control unit 211 becomes equal to or smaller than the threshold value, the blind decoding control unit 212 issues a control timer activation instruction to the signal generation unit 214. The signal generation unit 214 transmits the control timer activation instruction to the mobile station 1. With this configuration, the base station 2 can determine whether to put a limitation on the DCI formats to be decoded. In this case, the blind decoding control unit 212 issues a notification to the signal generation unit 214 in a non-periodic manner.

Figure 12:
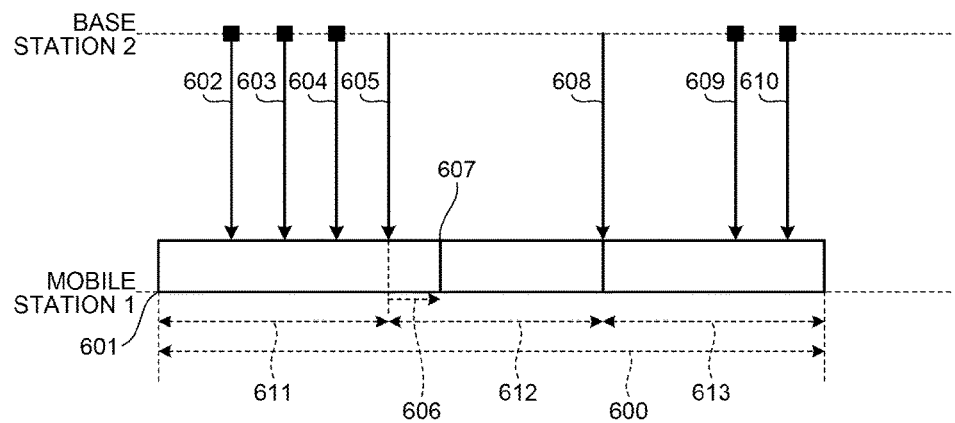
FIG. 12 is a diagram for explaining transitions of the DCI formats to be decoded in a wireless communication system according to a third embodiment.

Referring now to FIG. 12, transitions of the DCI formats to be decoded in the wireless communication system according to this embodiment are described. FIG. 12 is a diagram for explaining transitions of the DCI formats to be decoded in the wireless communication system according to the third embodiment.

At time 601, the mobile station 1 starts decoding PDCCHs of all the DCI formats having possibilities of reception and detecting a PDCCH for its own device. Thereafter the base station 2 sequentially transmits data 602 through 604 containing PDCCHs. The mobile station 1 sequentially receives and decodes the data 602 through 604 transmitted from the base station 2, detects a PDCCH for its own device, and processes respective data in accordance with the detected PDCCH.

An example case where the period for transmitting an amount of data comes after the data 604, and the amount of data is equal to or less than 10 packets is now described. The base station 2 transmits a signaling 605 containing a MAC CE for notifying of the amount of data, to the mobile station 1.

The mobile station 1 receives the signaling 605, and acquires the amount of data at the base station 2. Since the amount of data is equal to or less than 10 packets in this case, the mobile station 1 activates the control timer and measures a predetermined time period 606. At time 607 when the control timer expires, the mobile station 1 limits the DCI formats to be decoded to the DCI formats #0, #1A, and #1C.

After that, the base station 2 receives the data to be transmitted to the mobile station 1 from the higher-level station 3, and transmits a signaling 608 containing a PDCCH of the DCI format #1A containing Msg0 to the mobile station 1.

Since the DCI format #1A is included among the objects to be decoded, the mobile station 1 can detect a PDCCH by decoding the signaling containing Msg0. Upon reception of the signaling 608 notifying of Msg0, the mobile station 1 restores the DCI formats to be decoded to the regular DCI formats. The base station 2 then transmits data 609 and 610 containing PDCCHs to the mobile station 1. The mobile station 1 receives and decodes the data 609 and 610 transmitted from the base station 2, detects a PDCCH for its own device, and processes data in accordance with the detected PDCCH.

In view of the above, the mobile station 1 performs decoding 60 times at a maximum in a period 611 and a period 613 in the case of LTE-A. Meanwhile, in a period 612, the mobile station 1 may perform decoding 28 times at a maximum. Accordingly, the number of times decoding is performed in blind decoding and power consumption can be made smaller than those in a case where blind decoding is continued by performing decoding 60 times at a maximum in the entire "Active Time" period 600. Also, power can be saved independently of the respective timers that define the "Active Time". Accordingly, even in a case where the mobile station is unable to switch to a power saving mode due to running a plurality of applications, power consumption can be reduced in the mobile station.

Figure 13:
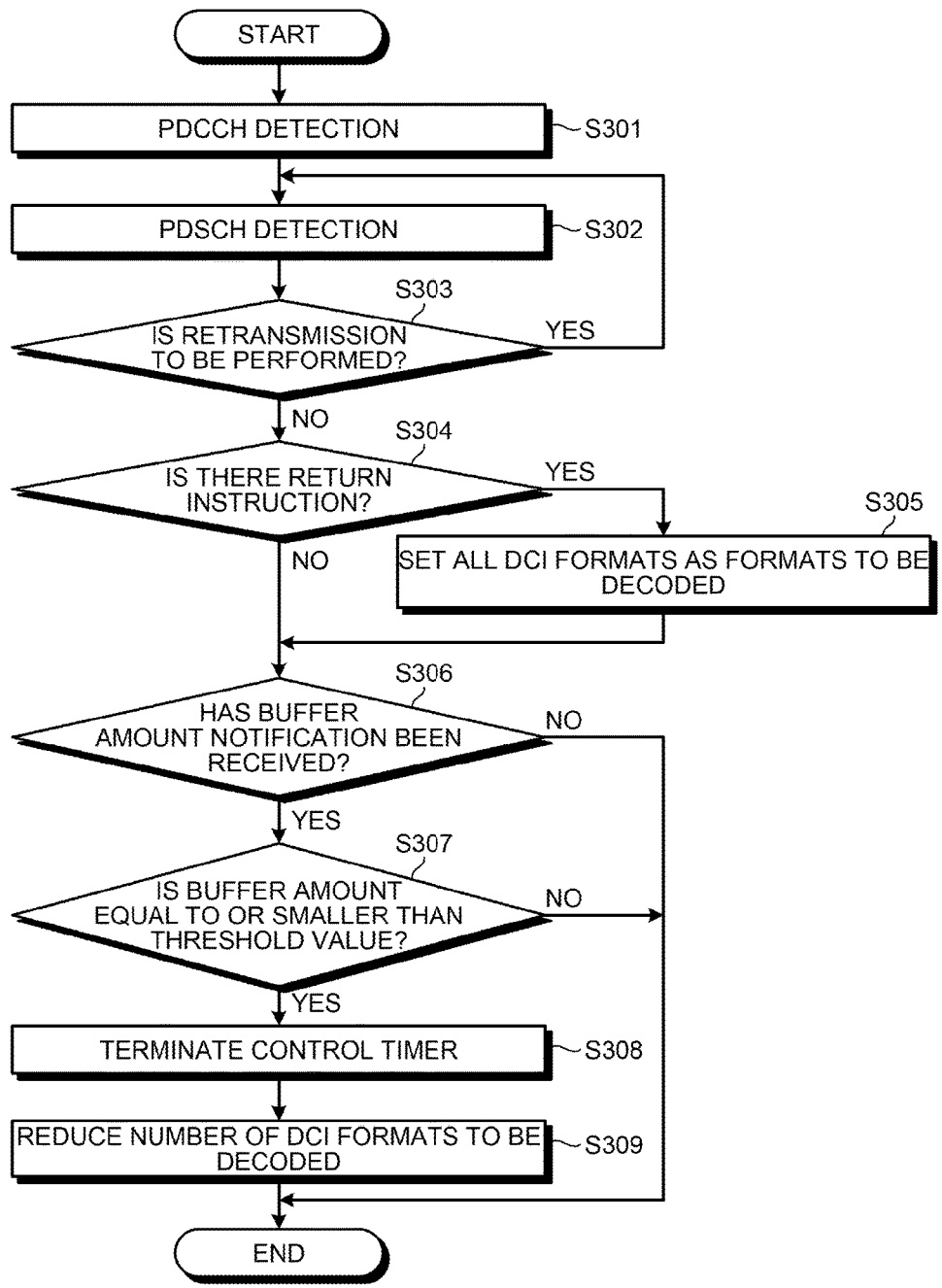
FIG. 13 is a flowchart of blind decoding control in a mobile station according to the third embodiment.

Referring now to FIG. 13, a flow of blind decoding control in the mobile station according to this embodiment is described. FIG. 13 is a flowchart of the blind decoding control in the mobile station according to the third embodiment.

The transmission/reception unit 11 receives data containing PDCCHs from the base station 2, and transmits the received data to the blind decoding control unit 112. The blind decoding control unit 112 decodes the PDCCHs having the DCI formats to be decoded among the received signals, and detects a PDCCH for its own device (step S301).

The PDCCH processing unit 111 receives the PDCCH detected by the blind decoding control unit 112, and instructs the PDSCH processing unit 121 to process a PDSCH in accordance with the received PDCCH. The PDSCH processing unit 121 receives a PDSCH from the transmission/reception unit 11, performs decoding, and detects and processes the PDSCH (step S302).

The HARQ management unit 122 receives a PDSCH processing result from the PDSCH processing unit 121. The HARQ management unit 122 then determines whether the received data requires being retransmitted (step S303). If retransmission is necessary (Yes in step S303), the HARQ management unit 122 issues a NACK transmission instruction to the uplink transmission unit 13, and returns to step S302.

If retransmission is not necessary (No in step S303), on the other hand, the blind decoding control unit 112 determines whether "Msg0", or a control signaling serving as a trigger to return to the regular blind decoding to be performed on all the DCI formats having possibilities of reception, has been received (step S304). If the control signaling has been received (Yes in step S304), the blind decoding control unit 112 changes the objects to be decoded to all the DCI formats having possibilities of reception (step S305). If the control signaling has not been received (No in step S304), on the other hand, the blind decoding control unit 112 moves on to step S306.

The blind decoding control unit 112 next determines whether a amount of data notification has been received (step S306). If an amount of data notification has been received (Yes in step S306), the blind decoding control unit 112 determines whether the received amount of data is equal to or smaller than the threshold value (step S307). If the amount of data is equal to or smaller than the threshold value (Yes in step S307), the blind decoding control unit 112 instructs the timer control unit 113 to activate the control timer. The timer control unit 113 then measures the time period determined beforehand by the control timer, and expires the control timer (step S308). Upon reception of a control timer expiration notification from the timer control unit 113, the blind decoding control unit 112 reduces the DCI formats to be decoded to the DCI formats #0, #1A, and #1C of the predetermined kinds (step S309).

On the other hand, if an amount of data notification has not been received (No in step S306) and if the amount of data is larger than the threshold value (No in step S307), the mobile station 1 ends the blind decoding control process.

Although a flow of a single blind decoding control process has been described with reference to FIG. 13, the mobile station 1 repeats the process illustrated in FIG. 13 during the "Active Time" period.

Figure 14:
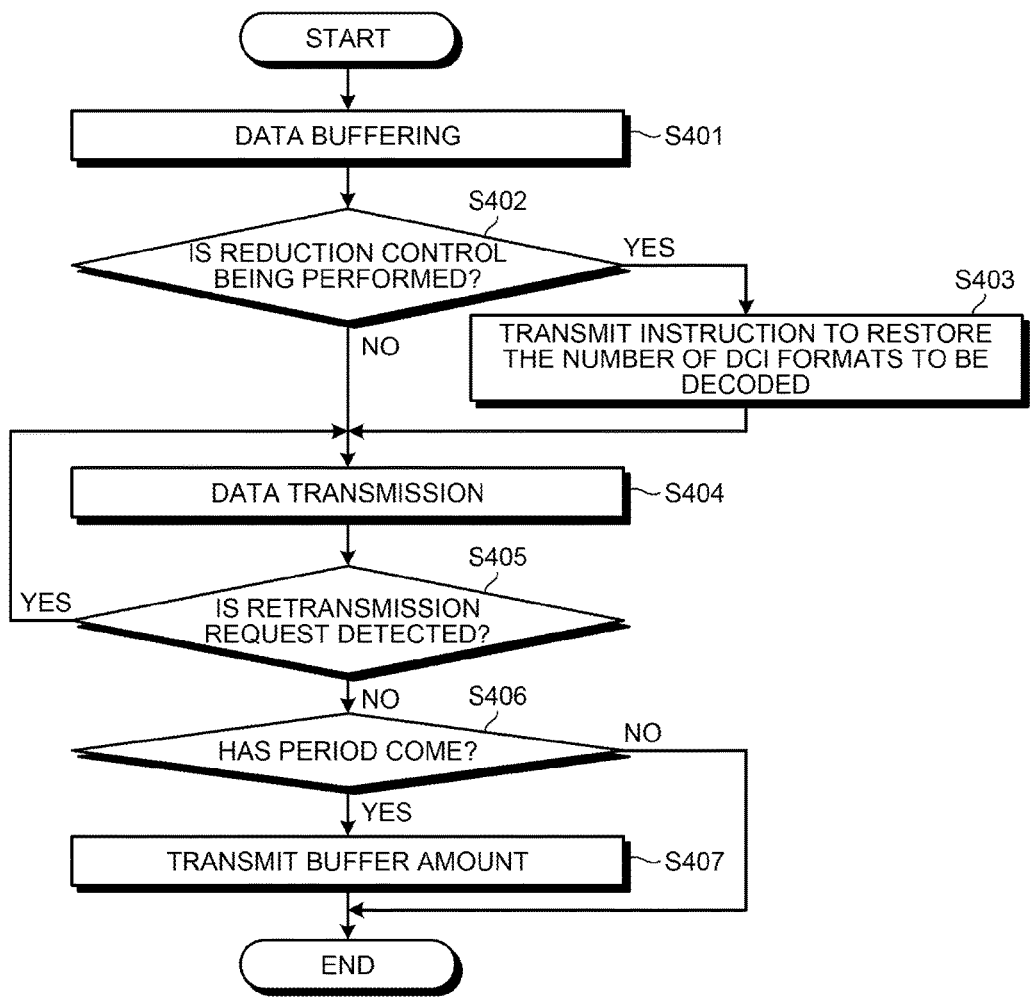
FIG. 14 is a flowchart of blind decoding control in a base station according to the third embodiment.

Referring now to FIG. 14, a flow of blind decoding control in the base station 2 according to this embodiment is described. FIG. 14 is a flowchart of blind decoding control in the base station according to the third embodiment.

The upper-level station transmission/reception unit 21 receives downlink data transmitted from the higher-level station 3 toward the mobile station 1. The buffer control unit 211 acquires the downlink data for the mobile station 1 from the upper-level station transmission/reception unit 21. Further, the buffer unit 221 stores the downlink data for the mobile station 1 in accordance with an instruction from the buffer control unit 211 (step S401).

Upon reception of a notification of arrival of the downlink data from the buffer control unit 211, the blind decoding control unit 212 determines whether reduction control is being performed to limit the DCI formats to be subjected to blind decoding in the mobile station 1 to predetermined kinds of DCI formats (step S402). If the reduction control is being performed (Yes in step S402), the blind decoding control unit 212 notifies the signal generation unit 214 of the arrival of the downlink data. The signal generation unit 214 then creates a PDCCH containing Msg0 serving as a trigger to restore the DCI formats to be decoded to all kinds of DCI formats having possibilities of reception, and transmits the created PDCCH to the mobile station 1 via the transmission/reception unit 24 (step S403). If the reduction control is not being performed (No in step S402), on the other hand, the blind decoding control unit 212 moves on to step S404.

The signal generation unit 214 then acquires data to be transmitted from the data accumulated in the buffer unit 221, and creates data containing PDCCHs and PDSCHs. The signal generation unit 214 then transmits the generated data to the mobile station 1 via the transmission/reception unit 24 (step S404).

The HARQ management unit 222 detects a retransmission request in accordance with a NACK from the mobile station 1 (step S405). If a retransmission request is detected (Yes in step S405), the HARQ management unit 222 instructs the signal generation unit 214 to retransmit the data that has failed to be transmitted, and returns to step S404.

If a retransmission request is not detected (No in step S405), on the other hand, the buffer control unit 211 determines whether the period for transmitting an amount of data has come (step S406). If the period has come (Yes in step S406), the buffer control unit 211 acquires the amount of data in the buffer unit 221. The buffer control unit 211 then notifies the blind decoding control unit 212 of the amount of data. The blind decoding control unit 212 instructs the signal generation unit 214 to issue an amount of data notification. Upon reception of the instruction from the blind decoding control unit 212, the signal generation unit 214 generates a MAC CE for notifying of the amount of data. After that, the signal generation unit 214 transmits the generated MAC CE to the mobile station 1 (step S407). If the period for transmitting an amount of data has not come (No in step S406), on the other hand, the base station 2 ends the blind decoding control process.

Although a flow of a single blind decoding control process has been described with reference to FIG. 14, the base station 2 repeats the process illustrated in FIG. 14 during the "Active Time" period.

As described above, in the wireless communication system according to this embodiment, a notification of the amount of data of the downlink data accumulated in the base station is issued. When the amount of data is equal to or smaller than the threshold value, the mobile station activates the control timer. When the control timer expires, the mobile station puts a limitation on the DCI formats to be decoded. In this manner, the DCI formats to be decoded can be limited without confirmation that the buffer has become empty. Accordingly, the number of times decoding is performed in blind decoding of PDCCHs during the "Active Time" period or while DRX is ON can also be reduced in the wireless communication system according to this embodiment. Processing in the mobile station can be reduced, and power consumption can be lowered accordingly.

(Modification 3-1)

Modification 3-1 differs from the third embodiment in that an instruction to perform timer control, instead of the amount of data of the downlink data accumulated in the base station, is transmitted to the base station.

The buffer control unit 211 acquires, from the buffer unit 221, the amount of data (or the BSI: Buffer Status Indicator) of the downlink data accumulated in the buffer unit 221. The buffer control unit 211 then outputs the acquired amount of data to the blind decoding control unit 212.

The blind decoding control unit 212 stores a threshold value of the amount of data for determining whether to transmit a timer control instruction. When the amount of data obtained from the buffer control unit 211 becomes equal to or smaller than the threshold value, the blind decoding control unit 212 instructs the signal generation unit 214 to transmit a timer control instruction.

The signal generation unit 214 generates a MAC CE containing a timer control instruction including a timer value. The signal generation unit 214 then transmits the generated MAC CE to the mobile station 1.

The blind decoding control unit 112 of the mobile station 1 receives the MAC CE containing the timer control instruction via the transmission/reception unit 11. The blind decoding control unit 112 then acquires the timer value from the received MAC CE, and sends a control timer activation instruction and the value of the control timer to the timer control unit 113. Upon reception of a control timer expiration notification from the timer control unit 113, the blind decoding control unit 112 limits the DCI formats to be decoded to the DCI formats #0, #1A, and #1C, for example.

The timer control unit 113 receives the timer activation instruction and the timer value from the blind decoding control unit 112. The timer control unit 113 then activates the control timer, and counts up to the notified control timer value. When the control timer expires, the timer control unit 113 notifies the blind decoding control unit 112 of expiration of the control timer.

In the modification 3-1, the mobile station 1 is notified of a timer value, and therefore, a MAC CE that can carry a relatively large amount of information is used for transmitting the control timer control instruction. However, notification methods are not limited to that. A method using a PDCCH is now described as an example. When a notification is made by using a PDCCH, it is not possible to transmit a large amount of information. Therefore, the signal generation unit 214 notifies the mobile station 1 of a control timer value through an RRC signaling in advance. The signal generation unit 214 then generates a signaling by adding a flag that is 1-bit information and serves as an instruction to activate the timer to a PDCCH. The signal generation unit 214 transmits the generated signaling to the mobile station 1. In this case, the timer control unit 113 of the mobile station 1 is notified by an RRC signaling that an instruction to activate the control timer is to be issued from the blind decoding control unit 112. Time is measured by using the control timer value.

(Modification 3-2)

Although the control timer value is a fixed value in the third embodiment, the control timer value varies with amounts of data in this modification that differs from the third embodiment in this aspect.

The signal generation unit 214 has a table showing the correspondence between the amount of data and the control timer value. The correspondence between the amount of data and the control timer value is configure, so that the control timer value becomes larger as the amount of data becomes larger, and the control timer value becomes smaller as the amount of data becomes smaller. The signal generation unit 214 acquires the control timer value corresponding to the amount of data shown in the notification from the blind decoding control unit 212. The signal generation unit 214 then creates a MAC CE containing a control timer activation instruction and the control timer value. The signal generation unit 214 transmits the created MAC CE to the mobile station 1.

The blind decoding control unit 112 does not have a threshold value in this modification. The blind decoding control unit 112 receives the MAC CE containing the control timer activation instruction and the control timer value via the transmission/reception unit 11.

The blind decoding control unit 112 acquires the control timer activation instruction and the control timer value from the received MAC CE. The blind decoding control unit 112 sends the control timer activation instruction and the control timer value to the timer control unit 113. Upon reception of a control timer expiration notification from the timer control unit 113, the blind decoding control unit 112 limits the DCI formats to be decoded to the DCI formats #0, #1A, and #1C, for example.

The timer control unit 113 receives the control timer activation instruction and the control timer value from the blind decoding control unit 112. The timer control unit 113 then activates the timer, and counts up to the indicated control timer value. When the control timer expires, the timer control unit 113 notifies the blind decoding control unit 112 of expiration of the control timer.

Fourth Embodiment

A wireless communication system according to this embodiment differs from the above described embodiments and modifications in that the base station 2 uses a control signaling serving as a trigger to configure PDCCHs of all kinds of formats having possibilities of reception as the objects to be decoded. Therefore, the control signaling is mainly described below. The mobile station and the base station according to this embodiment are also illustrated in the block diagrams in FIGS. 1 and 2. Explanation of the same configurations and actions of each unit as those of the above described embodiment and modifications is not repeated below.

The signal generation unit 214 receives an instruction to transmit the BSI=0 from the blind decoding control unit 212. The signal generation unit 214 then generates a PDCCH of the DCI format #1A, and transmits the PDCCH to the mobile station 1 via the transmission/reception unit 24. Here, the PDCCH of the DCI format #1A, instead of Msg0 as a trigger to make random access, is used in the notification of arrival of downlink data in this embodiment. In this case, the PDCCH of the DCI format #1A is the control signaling serving as a trigger to return to blind decoding.

In this embodiment, the blind decoding control unit 112 limits the DCI formats to be decoded to the DCI formats #0, #1A, and #1C. When receiving a PDCCH of the DCI format 1A from the base station 2 while putting a limitation on the kinds of the DCI formats to be decoded, the blind decoding control unit 112 performs decoding and detects the PDCCH for its own device. Acquiring the PDCCH of the DCI format #1A, the blind decoding control unit 112 returns to the state where all kinds of DCI formats having possibilities of reception are to be decoded. That is, the blind decoding control unit 112 in this embodiment uses not only a PDCCH of the DCI format #1A instructing to make random access but also a PDCCH of the DCI format #1A notifying of arrival of downlink data as a trigger to put a limitation on the objects to be decoded.

Figure 15:
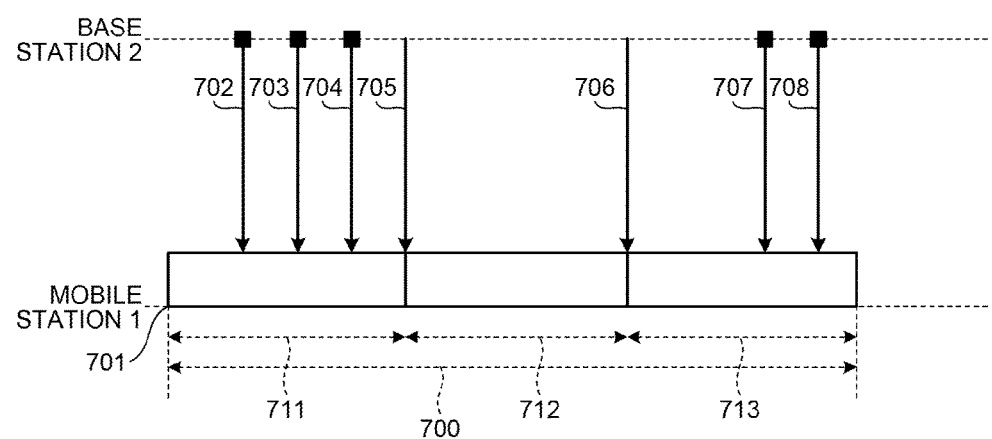
FIG. 15 is a diagram for explaining transitions of the DCI formats to be decoded in a wireless communication system according to a fourth embodiment.

Referring now to FIG. 15, transitions of the DCI formats to be decoded in the wireless communication system according to this embodiment are described. FIG. 15 is a diagram for explaining transitions of the DCI formats to be decoded in the wireless communication system according to the fourth embodiment.

At time 701, the mobile station 1 starts decoding PDCCHs of all the DCI formats having possibilities of reception and detecting a PDCCH for its own device. Thereafter the base station 2 sequentially transmits data 702 through 704 containing PDCCHs. The mobile station 1 sequentially receives and decodes the data 702 through 704 transmitted from the base station 2, detects a PDCCH for its own device, and processes respective data in accordance with the detected PDCCH.

Here, an example case where the buffer of the base station 2 becomes empty due to transmission of the data 704 is described. In this case, the DCI format #1 is used as the predetermined DCI format for notifying that the BSI is 0. The base station 2 transmits a signaling 705 generated by adding a "BSI=0" flag to a PDCCH having the DCI format #1, to the mobile station 1.

After receiving the signaling 705, the mobile station 1 performs decoding and detects a PDCCH for its own device. The mobile station 1 then confirms that the flag indicating BSI=0 is added to the detected PDCCH, and limits the DCI formats to be decoded to the DCI formats #0, #1A, and #1C.

After that, the base station 2 receives the data to be transmitted to the mobile station 1 from the higher-level station 3, and transmits a signaling 706 containing a PDCCH of the DCI format #1A to the mobile station 1.

Since the DCI format #1A is included among the objects to be decoded, the mobile station 1 can decode the received PDCCH of the DCI format #1A and detect the PDCCH. Upon reception of the signaling 706 that is the PDCCH of the DCI format #1A, the mobile station 1 returns to the state where all kinds of DCI formats having possibilities of reception are to be decoded. The base station 2 then transmits data 707 and 708 containing PDCCHs to the mobile station 1. The mobile station 1 receives and decodes the data 707 and 708 transmitted from the base station 2, detects a PDCCH for its own device, and processes data in accordance with the detected PDCCH.

In view of the above, the mobile station 1 performs decoding 60 times at a maximum in a period 711 and a period 713 in the case of LTE-A. Meanwhile, in a period 712, the mobile station 1 may perform decoding 28 times at a maximum. Accordingly, the number of times decoding is performed in blind decoding and power consumption can be made smaller than those in a case where blind decoding is continued by performing decoding 60 times at a maximum in the entire "Active Time" period 700.

As described above, in the wireless communication system according to this embodiment, a PDCCH of the DCI format #1A is used to cause the mobile station to return to the state where PDCCHs of all kinds of formats having possibilities of reception are to be decoded. Accordingly, notifications with great versatility can be made.

(Modification 4-1)

This modification differs from the first embodiment in that an instruction to change the objects to be decoded to PDCCHs of all kinds of formats having possibilities of reception can be issued by using a flag of a PDCCH, a MAC CE, or a padding of a PDSCH as a return command.

In a case where a flag of a PDCCH, a MAC CE, or a padding of a PDSCH is used, the mobile station 1 does not immediately return to the state where PDCCHs of all kinds of formats having possibilities of reception are to be decoded, even when a PDCCH of the DCI format #1A is transmitted. Meanwhile, a compact PDSCH can be transmitted in the DCI format #1A, since blind decoding on the DCI format #1A is being performed. In view of this, when the amount of data becomes equal to or larger than a predetermined value, a control signaling serving as a trigger to return to the state where PDCCHs of all kinds of formats having possibilities of reception are to be decoded can be issued in this modification. By virtue of such an action, the DCI format #1A for transmitting compact PDSCHs can continue to be used when the base station 2 does not require transmitting a large amount of data, for example. When the base station 2 transmits a large amount of data, on the other hand, the DCI format #1 can be used. The following is a description of an example case where a control signaling serving as a trigger to return to the state where PDCCHs of all kinds of formats having possibilities of reception are to be decoded is issued when the amount of data becomes equal to or larger than a predetermined value. In this modification, a notification is made by using a flag of a PDCCH.

The buffer control unit 211 acquires an amount of data from the buffer unit 221. The buffer control unit 211 then notifies the blind decoding control unit 212 of the acquired amount of data.

The blind decoding control unit 212 stores a amount of data threshold value for determining whether to put a limitation on the DCI formats to be decoded. When receiving the amount of data from the buffer control unit 211 while a limitation is put on the DCI formats to be decoded in the mobile station 1, the blind decoding control unit 212 determines whether the received amount of data does not exceed the threshold value.

If the amount of data does not exceed the threshold value, the blind decoding control unit 212 instructs the signal generation unit 214 to transmit data using a PDCCH of the DCI format #1A. In this case, if the amount of data is equal to or smaller than the threshold value, data transmission to the mobile station 1 can be scheduled by using a PDCCH of the DCI format #1A.

If the amount of data exceeds the threshold value, on the other hand, the blind decoding control unit 212 instructs the signal generation unit 214 to transmit a signaling generated by adding a flag indicating that the amount of data is equal to or larger than the threshold value to a PDCCH. This flag is created by adding 1-bit information to a PDCCH.

The signal generation unit 214 receives the instruction to transmit data using a PDCCH of the DCI format #1A from the blind decoding control unit 212. The signal generation unit 214 then acquires an amount of data transmittable in the DCI format #1A from the data accumulated in the buffer unit 221. The signal generation unit 214 then transmits a signaling containing data acquired by using a PDCCH of the DCI format #1A to the mobile station 1 via the transmission/reception unit 24.

The signal generation unit 214 also receives, from the blind decoding control unit 212, the instruction to transmit a signaling generated by adding the flag indicating that the amount of data is equal to or larger than the threshold value to a PDCCH. The signal generation unit 214 then generates a signaling by adding the flag to a PDCCH of the DCI format #1A being used in data transmission. The signal generation unit 214 then transmits the generated signaling to the mobile station 1 via the transmission/reception unit 24.

The blind decoding control unit 112 receives the signaling containing a PDCCH of the DCI format #1A which has the flag from the base station 2 via the transmission/reception unit 11, while putting a limitation on the DCI formats to be decoded. Since the DCI format #1A is to be decoded, the blind decoding control unit 112 can detect the PDCCH of the DCI format #1A for its own device in this case. The blind decoding control unit 112 then transmits the detected PDCCH of the DCI format #1A to the PDCCH processing unit 111. In this case, the blind decoding control unit 112 does not return to the state where all kinds of DCI formats having possibilities of reception are to be decoded.

The blind decoding control unit 112 also receives a PDCCH of the DCI format #1A accompanied by the flag from the transmission/reception unit 11. Since the DCI format #1A is to be decoded, the blind decoding control unit 112 can also detect the PDCCH of the DCI format #1A for its own device in this case. The blind decoding control unit 112 then confirms that the flag is added to the detected PDCCH. In this case, the blind decoding control unit 112 returns to the state where all kinds of DCI formats having possibilities of reception are to be decoded. Further, the blind decoding control unit 112 transmits the detected PDCCH to the PDCCH processing unit 111.

Although a notification is made by adding the flag to a PDCCH in the above description, it is also possible to use a MAC CE or a padding of a PDSCH as described above.

In a case where a MAC CE is used, for example, the blind decoding control unit 212 may cause the signal generation unit 214 to periodically notify the mobile station 1 of an amount of data. In the mobile station 1, a threshold value is stored, and, when the amount of data acquired from a received MAC CE is equal to or larger than the threshold value, the blind decoding control unit 112 returns to the state where all kinds of DCI formats having possibilities of reception are to be decoded.

In a case where a padding of a PDSCH is used, for example, the blind decoding control unit 212 transmits a signaling by adding a padding to a PDSCH when the amount of data is smaller than a threshold value, and transmits a signaling without a padding added to a PDSCH when the amount of data is equal to or larger than the threshold value. In the mobile station 1, when a padding is not detected from a received signaling, the blind decoding control unit 112 returns to the state where all kinds of DCI formats having possibilities of reception are to be decoded.

In the wireless communication system according to this modification, a limitation can be put on the kinds of DCI formats to be decoded until the amount of data becomes a certain value. Accordingly, the period for putting a limitation on the kinds of DCI formats to be decoded can be made longer, and the power consumption in the mobile station can be made smaller than in the first embodiment.

(Modification 4-2)

This modification differs from the first embodiment in that, while the DCI formats to be decoded are limited to the DCI formats #0, #1A, and #1C, the DCI format #0 as well as the DCI format #1A is used as a return command in issuing an instruction to return to the state where PDCCHs of all kinds of formats having possibilities of reception are to be decoded.

In data transmission at IP (Internet Protocol) levels, TCP (Transmission Control Protocol) is used on the assumption that many traffics normally involve non-real-time communications. When uplink data is generated in the mobile station 1, data generated by using TCP is transmitted, and the base station 2 returns a TCP ACK after appropriately receiving the TCP data. The base station 2 regards the TCP ACK as regular downlink data, and transmits the TCP ACK to the mobile station 1. Therefore, generation of uplink data can be regarded as arrival of downlink data in this case. In view of this, reception of the DCI format #1 controlling data transmission from the mobile station 1 to the base station 2 can be regarded as generation of downlink data. In a non-real-time communication, RLC AM (Radio Link Control Acknowledge Mode) is used as a wireless access protocol.

In a real-time communication, on the other hand, UDP (User Data Protocol) is used in data transmission at IP levels. When uplink data for the base station 2 is generated in the mobile station 1, data generated by using UDP is transmitted, but the base station 2 does not return an ACK as in the case of TCP even after receiving the UDP data. That is, in a real-time communication, generation of uplink data is not necessarily regarded as arrival of downlink data. Therefore, in a real-time communication, reception of the DCI format #0 is not regarded as generation of downlink data. In a real-time communication, RLC UM (Radio Link Control Un-acknowledge Mode) is normally used as a wireless access protocol. In view of the above, the mobile station 1 of this modification receives the DCI format #0, and, if in the RLC AM mode, the mobile station 1 enters the normal mode.

Figure 16:
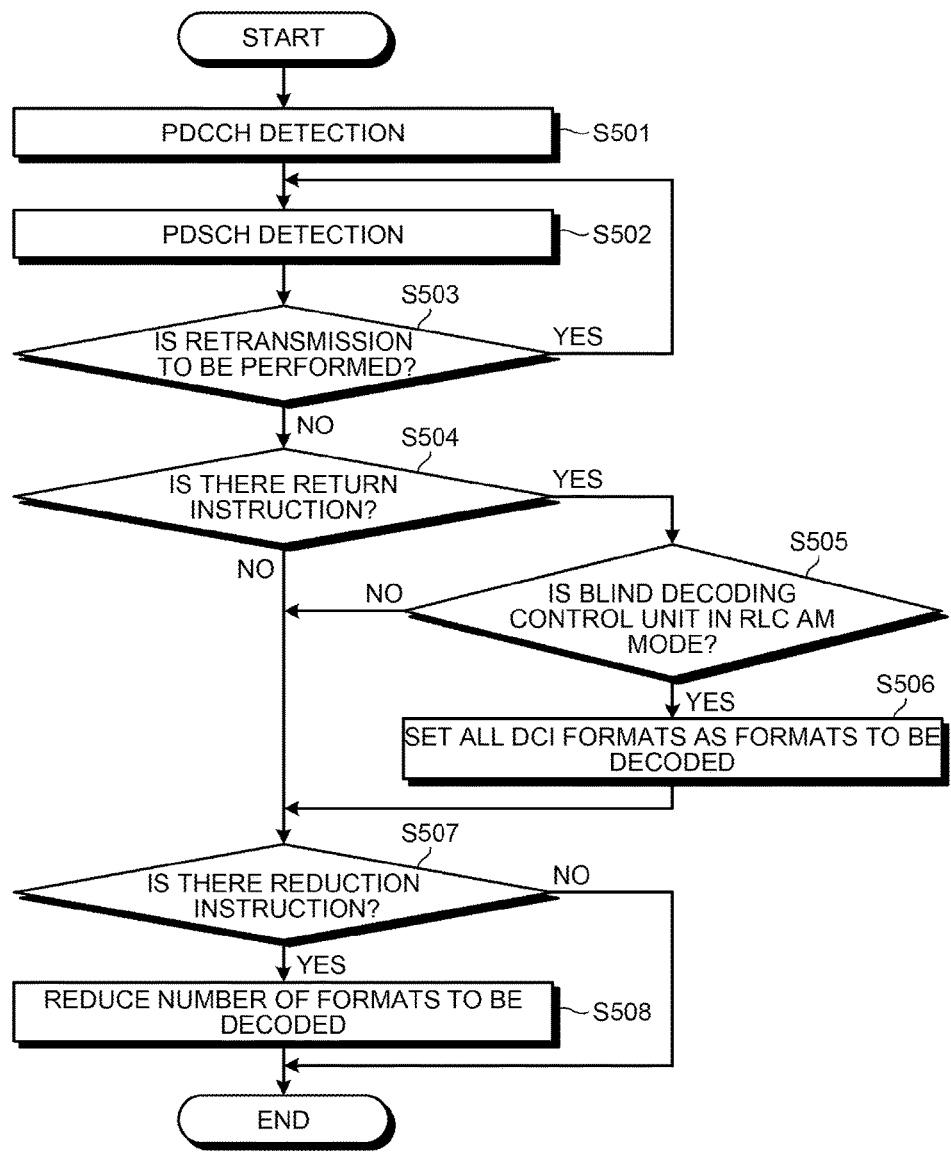
FIG. 16 is a flowchart of blind decoding control in a mobile station according to Modification 4-2.

Referring now to FIG. 16, a blind decoding control operation in the mobile station 1 according to this modification is described. FIG. 16 is a flowchart of the blind decoding control in the mobile station according to Modification 4-2.

The transmission/reception unit 11 receives data containing PDCCHs from the base station 2, and transmits the received data to the blind decoding control unit 112. The blind decoding control unit 112 decodes the PDCCHs having the DCI formats to be decoded among the received signals, and detects a PDCCH for its own device (step S501).

The PDCCH processing unit 111 receives the PDCCH detected by the blind decoding control unit 112, and instructs the PDSCH processing unit 121 to process a PDSCH in accordance with the received PDCCH. The PDSCH processing unit 121 receives a PDSCH from the transmission/reception unit 11, performs decoding, and detects and processes the PDSCH (step S502).

The HARQ management unit 122 receives a PDSCH processing result from the PDSCH processing unit 121. The HARQ management unit 122 then determines whether the received data requires being retransmitted (step S503). If retransmission is necessary (Yes in step S503), the HARQ management unit 122 issues a NACK transmission instruction to the uplink transmission unit 13, and returns to step S502.

If retransmission is not necessary (No in step S503), on the other hand, the blind decoding control unit 112 determines whether "Msg0" or a PDCCH of the DCI format #0 has been received. Specifically, the blind decoding control unit 112 determines whether a control signaling serving as a trigger to return to the regular blind decoding in which all the DCI formats having possibilities of reception are to be decoded (step S504). If the control signaling has been received (Yes in step S504), the blind decoding control unit 112 determines whether the operation is in the RLC AM mode (step S505). If the operation is in the RLC AM mode (Yes in step S505), the blind decoding control unit 112 changes the objects to be decoded to all the DCI formats having possibilities of reception (step S506). If the return instruction has not been received (No in step S504), on the other hand, or if the operation is not in the RLC AM mode (No in step S505), the blind decoding control unit 112 moves on to step S507.

The blind decoding control unit 112 then determines whether the BSI is 0 or whether a control signaling serving as a trigger to limit the objects to be decoded only to predetermined kinds of DCI formats or reduce the DCI formats to be decoded has been received (step S507). If the control signaling has been received (Yes in step S507), the blind decoding control unit 112 reduces the DCI formats to be decoded to the DCI formats #0, #1A, and #1C of the predetermined kinds (step S508). If the control signaling has not been received (No in step S507), on the other hand, the mobile station 1 ends the blind decoding control process.

Although a flow of a single blind decoding control process has been described with reference to FIG. 16, the mobile station 1 repeats the process illustrated in FIG. 16 during the "Active Time" period.

A flow of the blind decoding control in the base station 2 according to Modification 4-2 is the same as the flow illustrated in the flowchart in FIG. 10. When a PDCCH of the DCI format #0 is transmitted in step S204 in the flowchart in FIG. 10, the signaling serves as the return instruction to restore the DCI formats to be decoded to all kinds of DCI formats having possibilities of reception if the operation is in the RLC AM mode.

Fifth Embodiment

A wireless communication system according to this embodiment differs from the above described embodiments and modifications in that a return to the state where PDCCHs of all kinds of formats having possibilities of reception are to be decoded is conducted by using a timer. Therefore, the return to the state where PDCCHs of all kinds of formats having possibilities of reception using a timer is mainly described below. The mobile station and the base station according to this embodiment are also illustrated in the block diagrams in FIGS. 1 and 2. Explanation of the same configurations and actions of each unit as those of the above described embodiment and modifications is not repeated below. In this embodiment, the control timer of the third embodiment is used as the trigger to put a limitation on the DCI formats to be decoded.

The blind decoding control unit 112 issues a control timer activation instruction to the timer control unit 113. In this embodiment, the timer control unit 113 acquires a control timer value beforehand through RRC. The blind decoding control unit 112 receives a notification of expiration of the control timer from the timer control unit 113. The blind decoding control unit 112 then limits the DCI formats to be decoded to the DCI formats #0, #1A, and #1C. After that, the blind decoding control unit 112 receives a notification of expiration of a return timer from the timer control unit 113. The return timer measures the time required for returning to the state where all the DCI formats having possibilities of reception are to be decoded. The blind decoding control unit 112 then returns to the state where all the DCI formats having possibilities of reception are to be decoded.

The timer control unit 113 stores beforehand a value for the return timer that measures the time required for returning to the state where all the DCI formats having possibilities of reception are to be decoded.

The timer control unit 113 receives a control timer activation instruction from the blind decoding control unit 112. The timer control unit 113 then activates the control timer, and measures time. When the control timer expires, the timer control unit 113 notifies the blind decoding control unit 112 of expiration of the control timer.

When the control timer expires, the timer control unit 113 further activates the return timer. Using the return timer, the timer control unit 113 measures time up to the stored value. When the return timer expires, the timer control unit 113 notifies the blind decoding control unit 112 of expiration of the return timer.

Figure 17:
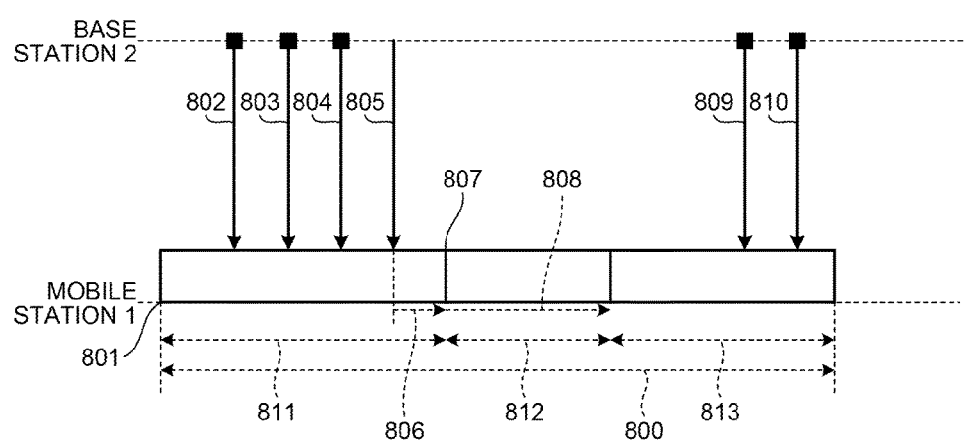
FIG. 17 is a diagram for explaining transitions of the DCI formats to be decoded in a wireless communication system according to a fifth embodiment.

Referring now to FIG. 17, transitions of the DCI formats to be decoded in the wireless communication system according to this embodiment are described. FIG. 17 is a diagram for explaining transitions of the DCI formats to be decoded in the wireless communication system according to the fifth embodiment.

At time 801, the mobile station 1 starts decoding PDCCHs of all the DCI formats having possibilities of reception and detecting a PDCCH for its own device. Thereafter the base station 2 sequentially transmits data 802 through 804 containing PDCCHs. The mobile station 1 sequentially receives and decodes the data 802 through 804 transmitted from the base station 2, detects a PDCCH for its own device, and processes respective data in accordance with the detected PDCCH.

An example case where the period for transmitting a amount of data comes after the data 804, and the amount of data is equal to or less than 10 packets is now described. The base station 2 transmits a signaling 805 containing a MAC CE for notifying of the amount of data, to the mobile station 1.

The mobile station 1 receives the signaling 805, and acquires the amount of data at the base station 2. Since the amount of data is equal to or less than 10 packets in this case, the mobile station 1 activates the control timer and measures a predetermined time period 806. At time 807 when the control timer expires, the mobile station 1 limits the DCI formats to be decoded to the DCI formats #0, #1A, and #1C.

At time 807 when the control timer expires, the mobile station 1 further activates the return timer, and measures a predetermined time period 808. When the return timer expires, the mobile station 1 restores the DCI formats to be decoded to the regular DCI formats. The base station 2 then transmits data 809 and 810 containing PDCCHs to the mobile station 1. The mobile station 1 receives and decodes the data 809 and 810 transmitted from the base station 2, detects a PDCCH for its own device, and processes data in accordance with the detected PDCCH.

In view of the above, the mobile station 1 performs decoding 60 times at a maximum in a period 811 and a period 813 in the case of LTE-A. Meanwhile, in a period 812, the mobile station 1 performs decoding 28 times at a maximum. Accordingly, the number of times decoding is performed in blind decoding and power consumption can be made smaller than those in a case where blind decoding is continued by performing decoding 60 times at a maximum in the entire "Active Time" period 800. Also, power can be saved independently of the respective timers that define the "Active Time". Accordingly, even in a case where the mobile station is unable to switch to a power saving mode due to running a plurality of applications, power consumption can be reduced in the mobile station.

Figure 18:
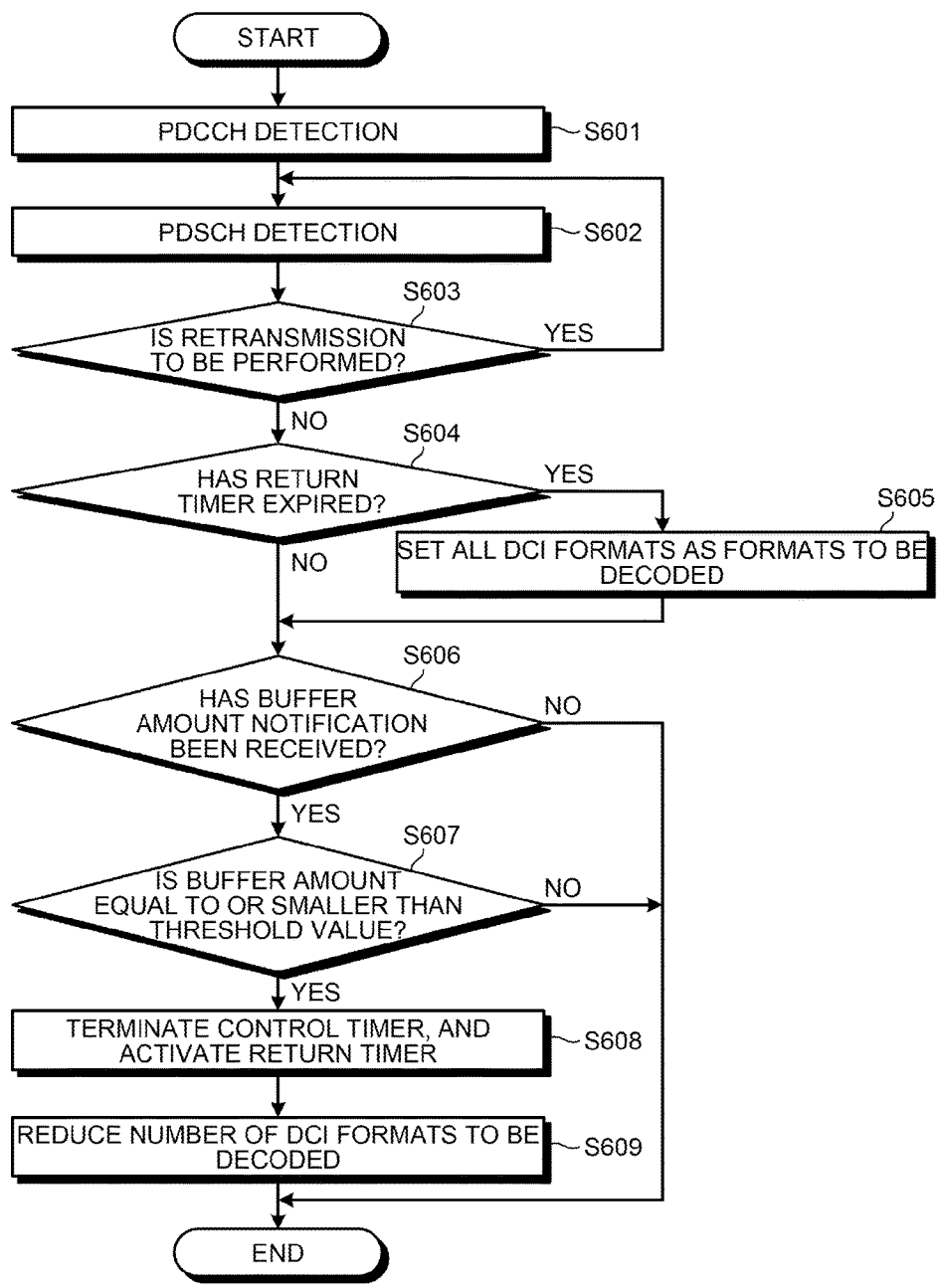
FIG. 18 is a flowchart of blind decoding control in a mobile station according to the fifth embodiment.

Referring now to FIG. 18, a flow of blind decoding control in the mobile station according to this embodiment is described. FIG. 18 is a flowchart of the blind decoding control in the mobile station according to the fifth embodiment.

The transmission/reception unit 11 receives data containing PDCCHs from the base station 2, and transmits the received data to the blind decoding control unit 112. The blind decoding control unit 112 decodes the PDCCHs having the DCI formats to be decoded among the received signals, and detects a PDCCH for its own device (step S601).

The PDCCH processing unit 111 receives the PDCCH detected by the blind decoding control unit 112, and instructs the PDSCH processing unit 121 to process a PDSCH in accordance with the received PDCCH. The PDSCH processing unit 121 receives a PDSCH from the transmission/reception unit 11, performs decoding, and detects and processes the PDSCH (step S602).

The HARQ management unit 122 receives a PDSCH processing result from the PDSCH processing unit 121. The HARQ management unit 122 determines whether the received data requires being retransmitted (step S603). If retransmission is necessary (Yes in step S603), the HARQ management unit 122 issues a NACK transmission instruction to the uplink transmission unit 13, and returns to step S602.

If retransmission is not necessary (No in step S603), on the other hand, the blind decoding control unit 112 determines whether the return timer has expired (step S604). If the return timer has expired (Yes in step S604), the blind decoding control unit 112 changes the objects to be decoded to all the DCI formats having possibilities of reception (step S605). If the return timer has not yet expired (No in step S604), on the other hand, the blind decoding control unit 112 moves on to step S606.

The blind decoding control unit 112 next determines whether an amount of data notification has been received (step S606). If an amount of data notification has been received (Yes in step S606), the blind decoding control unit 112 determines whether the received amount of data is equal to or smaller than the threshold value (step S607). If the amount of data is equal to or smaller than the threshold value (Yes in step S607), the blind decoding control unit 112 instructs the timer control unit 113 to activate the control timer. The timer control unit 113 then measures the time period determined beforehand by the control timer, expires the control timer, and activates the return timer (step S608). Upon reception of a control timer termination notification from the timer control unit 113, the blind decoding control unit 112 reduces the DCI formats to be decoded to the DCI formats #0, #1A, and #1C of the predetermined kinds (step S609).

If an amount of data notification has not been received (No in step S606) and if the amount of data is larger than the threshold value (No in step S607), the mobile station 1 ends the blind decoding control process.

Although a flow of a single blind decoding control process has been described with reference to FIG. 18, the mobile station 1 repeats the process illustrated in FIG. 18 during the "Active Time" period.

Figure 19:
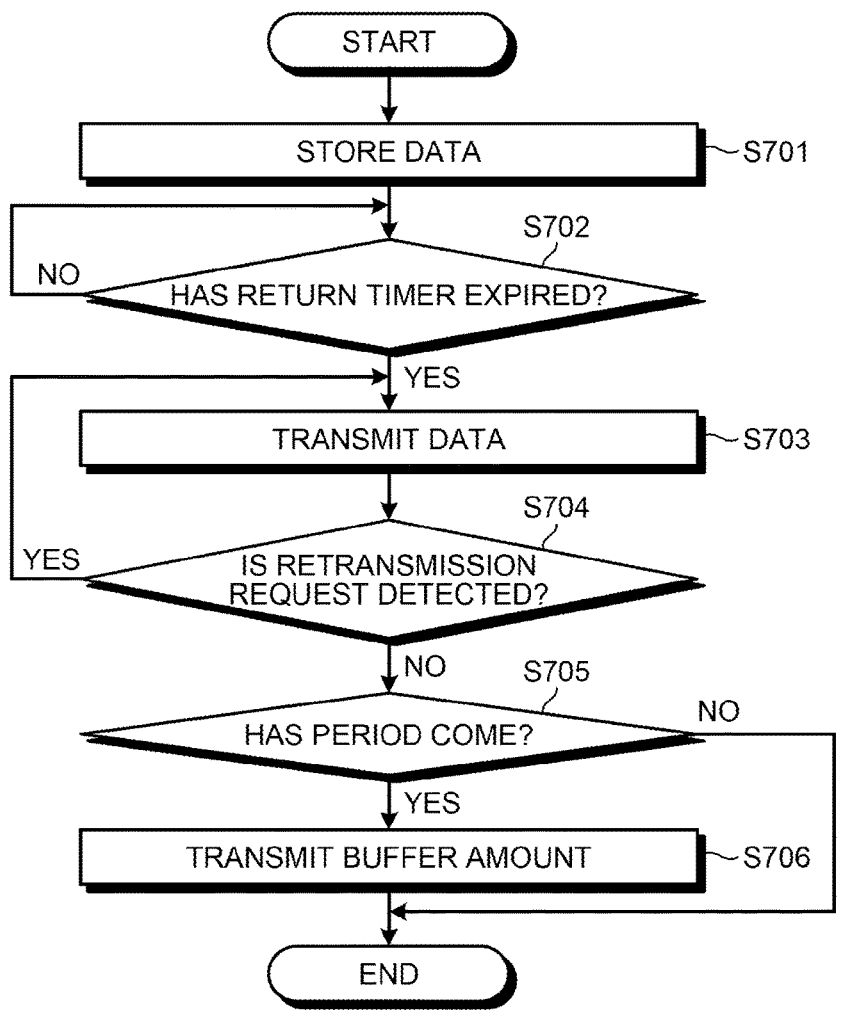
FIG. 19 is a flowchart of blind decoding control in a base station according to the fifth embodiment.

Referring now to FIG. 19, a flow of blind decoding control in the base station 2 according to this embodiment is described. FIG. 19 is a flowchart of blind decoding control in the base station according to the fifth embodiment.

The higher-level station transmission/reception unit 21 receives downlink data transmitted from the upper-level station 3 toward the mobile station 1. The buffer control unit 211 acquires the downlink data for the mobile station 1 from the upper-level station transmission/reception unit 21. Further, the buffer unit 221 stores the downlink data for the mobile station 1 in accordance with an instruction from the buffer control unit 211 (step S701).

The blind decoding control unit 212 determines whether the return timer of the mobile station 1 has expired (step S702). If the return timer has not yet expired (No in step S702), the blind decoding control unit 212 awaits until the return timer expires. If the return timer has expired (Yes in step S702), the signal generation unit 214 acquires data to be transmitted from the data accumulated in the buffer unit 221, and creates data containing PDCCHs and PDSCHs. The signal generation unit 214 then transmits the generated data to the mobile station 1 via the transmission/reception unit 24 (step S703).

The HARQ management unit 222 detects a retransmission request in accordance with a NACK from the mobile station 1 (step S704). If a retransmission request is detected (Yes in step S704), the HARQ management unit 222 instructs the signal generation unit 214 to retransmit the data that has failed to be transmitted, and returns to step S703.

If a retransmission request is not detected (No in step S704), on the other hand, the buffer control unit 211 determines whether the period for transmitting an amount of data has come (step S705). If the period has come (Yes in step S705), the buffer control unit 211 acquires the amount of data in the buffer unit 221. The buffer control unit 211 then instructs the signal generation unit 214 to issue a notification of the amount of data. Upon reception of the instruction from the blind decoding control unit 212, the signal generation unit 214 generates a MAC CE for notifying of the amount of data. After that, the signal generation unit 214 transmits the generated MAC CE to the mobile station 1 (step S706). If the period for transmitting an amount of data has not come (No in step S705), on the other hand, the base station 2 ends the blind decoding control process.

Although a flow of a single blind decoding control process has been described with reference to FIG. 19, the base station 2 repeats the process illustrated in FIG. 19 during the "Active Time" period.

The connections between the return timer and the respective timers involved in DRX are now described. When the return timer expires, Short DRX or Long DRX might be executed. In this case, the blind decoding control unit 112 immediately cancels Short DRX or Long DRX, and enters OnDuration. After that, the blind decoding control unit 112 may return to the state where all the DCI formats having possibilities of reception are to be decoded, or, if downlink data has not yet arrived, the blind decoding control unit 112 may remain in the state where the DCI formats to be decoded are limited. In some other case, OnDuration might start while the return timer is still in operation. In this case, the blind decoding control unit 112 does not immediately enter OnDuration, but starts entering OnDuration only after the return timer expires. In short, the blind decoding control unit 112 links the expiration of the return timer to the start position of OnDuration, and returns to the normal mode when downlink data arrives.

As described above, in the wireless communication system according to this embodiment, the mobile station activates the return timer, and autonomously measures the time to return to the state where all the DCI formats having possibilities of reception are to be decoded. Accordingly, it is possible to return to the state where all the DCI formats having possibilities of reception are to be decoded, without awaiting a notification from the base station. For example, even when notifications from the base station are not receivable, the mobile station can return to the state where all the DCI formats having possibilities of reception are to be decoded.

Sixth Embodiment

A wireless communication system according to this embodiment differs from the above described embodiments and modifications in that not only DS but also SPS is executed as a scheduler. The mobile station and the base station according to this embodiment are also illustrated in the block diagrams in FIGS. 1 and 2. Explanation of the same configurations and actions of each unit as those of the above described embodiment and modifications is not repeated below.

The blind decoding control unit 112 receives a PDCCH accompanied by a flag indicating BSI=0 via the transmission/reception unit 11. The blind decoding control unit 112 then limits the DCI formats to be decoded to the DCI formats #0, #1A, and #1C, for example. The blind decoding control unit 112 further receives a signaling in the DCI format #1A containing Msg0 via the transmission/reception unit 11. The blind decoding control unit 112 then returns to the state where all the DCI formats having possibilities of reception are to be decoded.

The blind decoding control unit 112 further receives a SPS transmission time from the timer control unit 113 while the DCI formats to be decoded are limited. At the start position of the SPS transmission time, the blind decoding control unit 112 returns to the state where all the DCI formats having possibilities of reception are to be decoded. At the end position of the SPS transmission time, the blind decoding control unit 112 returns to the state where the DCI formats to be decoded are limited.

The timer control unit 113 receives an RRC signaling containing the SPS transmission time from the base station 2 via the transmission/reception unit 11. The timer control unit 113 then acquires SPS transmission intervals from the received RRC signaling. Upon reception of an activation command in a PDCCH, the timer control unit 113 notifies the blind decoding control unit 112 of the SPS transmission time.

The scheduling unit 23 in the base station 2 calculates the SPS transmission time. The scheduling unit 23 then notifies the signaling generation unit 214 of the calculated SPS transmission time.

The signal generation unit 214 receives a SPS transmission time notification from the scheduling unit 23. The signal generation unit 214 then generates an RRC signaling containing the SPS transmission time. The signal generation unit 214 transmits the generated RRC signaling to the mobile station 1 via the transmission/reception unit 24. Further, when the SPS is actually started, an activation command in a PDCCH is transmitted, and the SPS is started from its sub-frame.

Figure 20:
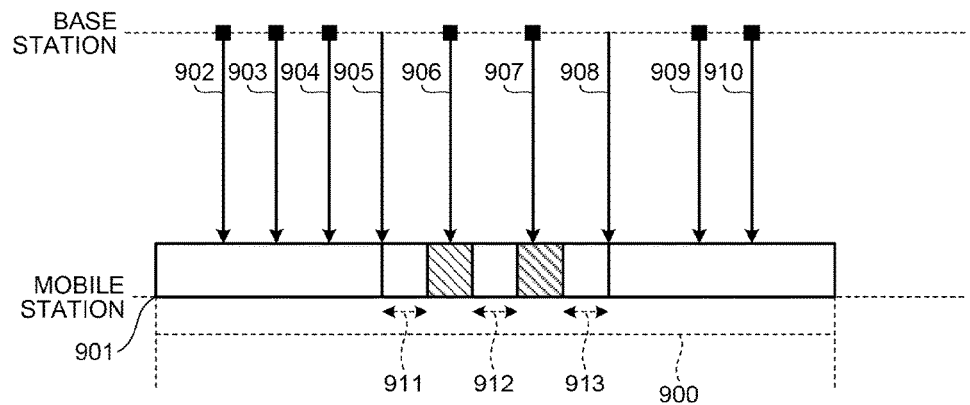
FIG. 20 is a diagram for explaining transitions of the DCI formats to be decoded in a wireless communication system according to the sixth embodiment.

Referring now to FIG. 20, transitions of the DCI formats to be decoded in the mobile station are described. FIG. 20 is a diagram for explaining transitions of the DCI formats to be decoded in the wireless communication system according to the sixth embodiment.

At time 901, the mobile station 1 starts decoding PDCCHs of all the DCI formats having possibilities of reception and detecting a PDCCH for its own device. Thereafter the base station 2 sequentially transmits data 902 through 904 containing PDCCHs. The mobile station 1 sequentially receives and decodes the data 902 through 904 transmitted from the base station 2, detects a PDCCH for its own device, and processes respective data in accordance with the detected PDCCH.

Here, an example case where the buffer of the base station 2 becomes empty due to transmission of the data 904 is described. The base station 2 transmits a signaling 905 generated by adding a "BSI=0" flag to a PDCCH, to the mobile station 1.

After receiving the signaling 905, the mobile station 1 performs decoding and detects a PDCCH for its own device. The mobile station 1 then confirms that the flag indicating BSI=0 is added to the detected PDCCH, and limits the DCI formats to be decoded to the DCI formats #0, #1A, and #1C.

Further, when the SPS transmission time comes, the mobile station 1 returns to the state where all kinds of DCI formats having possibilities of reception are to be decoded. In FIG. 20, the shaded portions are equivalent to the SPS transmission time, and in those portions, the mobile station 1 returns to the state where all kinds of DCI formats having possibilities of reception are to be decoded. During the time, the mobile station 1 can receive data 906 and 907 transmitted by the base station 2.

After that, the base station 2 receives the data to be transmitted to the mobile station 1 from the upper-level station 3, and transmits a signaling 908 containing a PDCCH of the DCI format #1A containing Msg0 to the mobile station 1.

Upon reception of the signaling 908 for notifying of Msg0, the mobile station 1 returns to the state where all kinds of DCI formats having possibilities of reception are to be decoded. The base station 2 then transmits data 909 and 910 containing PDCCHs to the mobile station 1. The mobile station 1 receives and decodes the data 909 and 910 transmitted from the base station 2, detects a PDCCH for its own device, and processes data in accordance with the detected PDCCH.

In view of the above, the mobile station 1 may perform decoding 28 times at a maximum in periods 911, 912, and 913 in the case of LTE-A. Accordingly, the number of times decoding is performed in blind decoding and power consumption can be made smaller than those in a case where blind decoding is continued by performing decoding 60 times at a maximum in the entire "Active Time" period 900.

Figure 21:
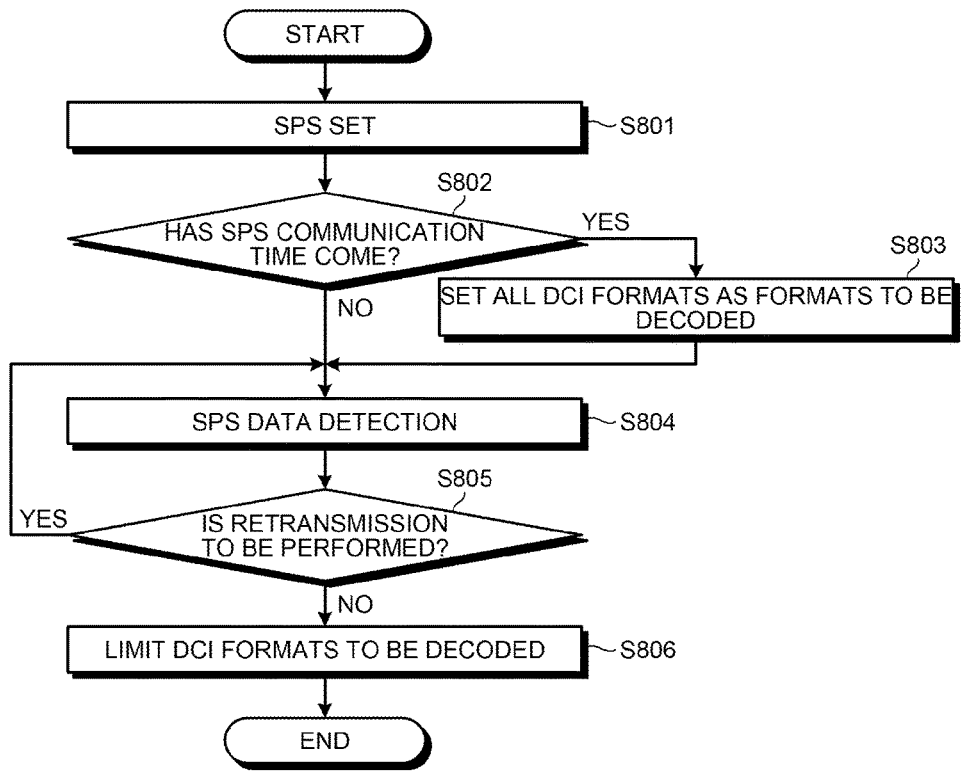
FIG. 21 is a flowchart of blind decoding control when SPS is received in a mobile station according to a sixth embodiment.

Referring now to FIG. 21, a flow of blind decoding control upon reception of SPS in the mobile station according to this embodiment is described. FIG. 21 is a flowchart of the blind decoding control upon reception of SPS in the mobile station 1 according to the sixth embodiment.

The timer control unit 113 receives an RRC signaling containing SPS transmission intervals and the like, and an activation command in a PDCCH for actually starting a communication. The timer control unit 113 acquires the transmission intervals from the RRC signaling, and SPS-related information such as the transmission time from the activation command in a PDCCH, and configures SPS (step S801).

Upon reception of a notification from the timer control unit 113, the blind decoding control unit 112 determines whether an SPS communication time has come (step S802). If an SPS communication time has come (Yes in step S802), the blind decoding control unit 112 returns to the state where all the DCI formats having possibilities of reception are to be decoded (step S803). If an SPS communication time has not come (No in step S802), on the other hand, the blind decoding control unit 112 moves on to step S804.

The blind decoding control unit 112 detects SPS data transmitted from the base station 2 (step S804). The HARQ management unit 122 determines whether the received SPS data requires being retransmitted (step S805). If retransmission of the received SPS data is necessary (Yes in step S805), the blind decoding control unit 112 returns to step S804.

If retransmission of the received SPS data is not necessary (No in step S805), on the other hand, the blind decoding control unit 112 puts a limitation on the kinds of DCI formats to be decoded (step S806).

As described above, when the SPS transmission time comes, the wireless communication system according to this embodiment returns to the state where all kinds of DCI formats having possibilities of reception are to be decoded, even in the state where the DCI formats to be decoded are limited. Accordingly, when both SPS and DS are used as a scheduler, both SPS and DS signals can be received while power consumption is reduced.

(Hardware Configuration)

Figure 22:
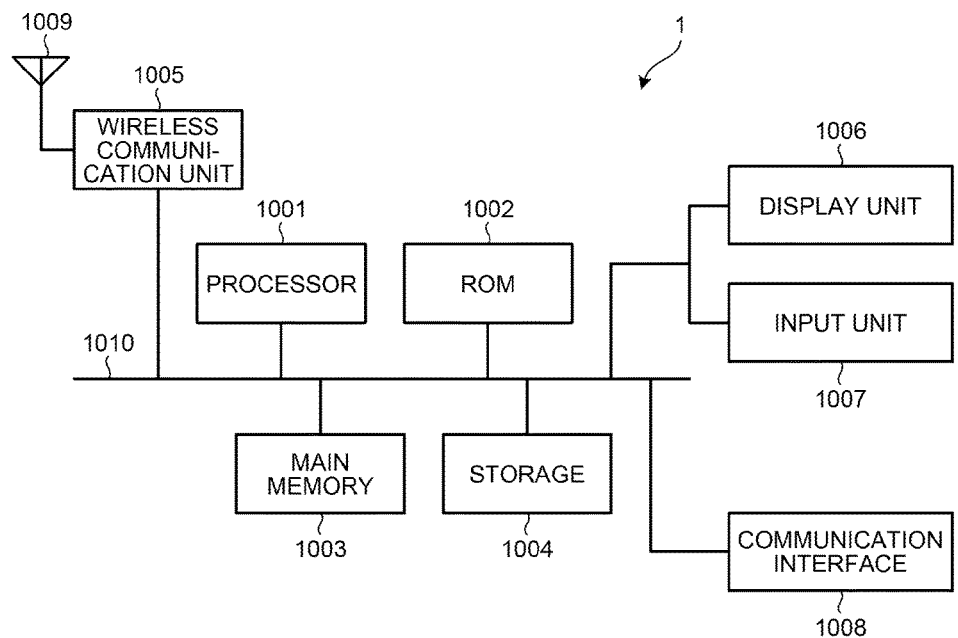
FIG. 22 is a hardware configuration diagram of a mobile station.
Figure 23:
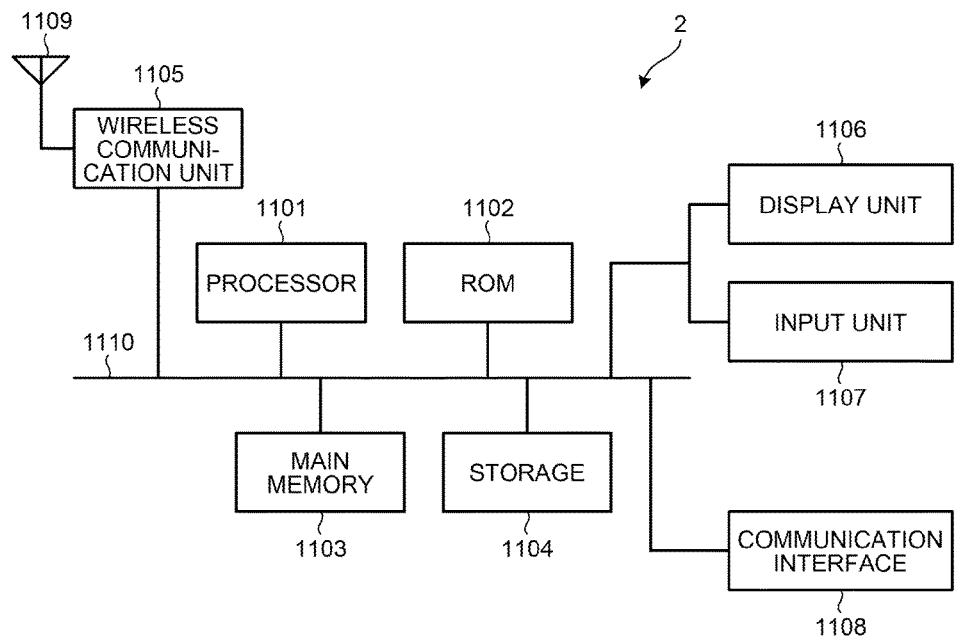
FIG. 23 is a hardware configuration diagram of a base station.

Next, the hardware configurations of the mobile station 1 and the base station 2 according to each of the above described embodiments and modifications are described. FIG. 22 is a hardware configuration diagram of the mobile station. FIG. 23 is a hardware configuration diagram of the base station.

As illustrated in FIG. 22, the mobile station 1 includes a processor 1001, a ROM 1002, a main memory 1003, a storage 1004, a wireless communication unit 1005, a display unit 1006, an input unit 1007, a communication interface 1008, and an antenna 1009.

The ROM 1002, the main memory 1003, the storage 1004, the wireless communication unit 1005, the display unit 1006, the input unit 1007, and the communication interface 1008 are connected to the processor 1001 via a bus 1010.

The display unit 1006 is a liquid crystal display, for example. The input unit 1007 is a keypad, for example. The operator of the mobile station 1 uses the display unit 1006 and the input unit 1007 to input a telephone number or the like.

The communication interface 1008 is a speaker and a microphone, for example. An operator of the mobile station 1 performs operations such as voice transmission/reception by using the communication interface 1008.

The antenna 1009 is connected to the wireless communication unit 1005. The wireless communication unit 1005 and the processor 1001 realize the functions of the transmission/reception unit 11 illustrated in FIG. 1, for example.

The ROM 1002 stores programs for the control plane unit 110, the data plane unit 120, and the uplink transmission unit 13 to perform various kinds of processing, for example. The processor 1001 reads the respective programs stored in the ROM 1002, loads the programs into the main memory 1003, and generates and executes the processes for performing each processing.

The processor 1001, the ROM 1002, the main memory 1003, and the storage 1004 realize the above described functions of the control plane unit 110, the data plane unit 120, and the uplink transmission unit 13 illustrated in FIG. 1, for example.

As illustrated in FIG. 23, the base station 2 includes a processor 1101, a ROM 1102, a main memory 1103, a storage 1104, a wireless communication unit 1105, a display unit 1106, an input unit 1107, a communication interface 1108, and an antenna 1109.

The ROM 1102, the main memory 1103, the storage 1104, the wireless communication unit 1105, the display unit 1106, the input unit 1107, and the communication interface 1108 are connected to the processor 1101 via a bus 1110.

The display unit 1106 is a monitor, for example. The input unit 1107 is a keyboard, for example. The operator of the base station 2 uses the display unit 1106 and the input unit 1107 to input a telephone number or the like.

The communication interface 1108 is an interface for performing communications with higher-level stations. Specifically, the communication interface 1108 is a network board, an ADC (Analog-Digital Converter), or the like. The communication interface 1108 and the processor 1101 realize the functions of the higher-level station transmission/reception unit 21 illustrated in FIG. 2, for example.

The antenna 1109 is connected to the wireless communication unit 1105. The wireless communication unit 1105 and the processor 1101 realize the functions of the transmission/reception unit 24 illustrated in FIG. 2, for example.

The storage 1104 is a storage device such as a hard disk. The storage 1104 and the processor 1101 realize the functions of the buffer unit 221.

The ROM 1102 stores programs for the control plane unit 210, the data plane unit 220, and the scheduling unit 23 to perform various kinds of processing, for example. The processor 1101 reads the respective programs stored in the ROM 1102, loads the programs into the main memory 1103, and generates and executes the processes for performing each processing.

The processor 1101, the ROM 1102, the main memory 1103, and the storage 1104 realize the above described functions of the control plane unit 210, the data plane unit 220, and the scheduling unit 23 illustrated in FIG. 2, for example.

An aspect of a wireless communication system, a mobile station, a base station, and a wireless communication system control method disclosed in this application can achieve the effect to efficiently reduce power consumption.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A reducing power consumption wireless communication system comprising a mobile station and a base station, wherein:
the base station includes a controller configured to:
control transmission of a signal including a first Physical Downlink Control Channel (PDCCH) to the mobile station based on a data amount in the base station to be transmitted to the mobile station; and
notify the mobile station of timer activation, and
the mobile station includes a decoder configured to:
perform intermittent reception at predetermined intervals without performing selection on signals to be transmitted by the base station, and activate a timer upon reception of a notification of the timer activation from the controller;
when the timer has counted a first predetermined period and upon reception of the first PDCCH from the base station, select a predetermined format to be decoded from among formats to be used for the signals to be transmitted by the base station, and detect a second PDCCH directed to the mobile station by decoding a received signal having the predetermined format among the signals received from the base stations;
when the timer has counted a second predetermined period, a downlink data communication is performed, and an intermittent reception period has not come, immediately start the intermittent reception and repeat the intermittent reception at the predetermined intervals; and
when the intermittent reception period has come before the timer has counted the second predetermined period, start the intermittent reception after the timer has counted the second predetermined period and repeat the intermittent reception at the predetermined intervals.

2. The reducing power consumption wireless communication system according to claim 1, wherein the base station further includes:
a buffer controller configured to measure a data amount to be transmitted to the mobile station,
a signal transmitter configured to transmit the signal including the first PDCCH directed to the mobile station,
the controller transmits the signals to the mobile station via the signal transmitter, using the result of the measurement carried out by the buffer controller as the result of the measurement of the data amount to be transmitted to the mobile station.

3. The reducing power consumption wireless communication system according to claim 2, wherein:
the controller determines whether the data amount to be transmitted to the mobile station measured by the buffer controller is equal to or smaller than a predetermined value, and notifies the mobile station of a transition to a power consumption reducing mode when the result of the determination indicates that the data amount to be transmitted to the mobile station is equal to or smaller than the predetermined value, and
upon reception of the notification from the controller, the decoder selects a second predetermined format from among the signal formats to be used for the signals to be transmitted by the signal transmitter.

4. The reducing power consumption wireless communication system according to claim 2, wherein:
the controller notifies the mobile station of a data increase, using a third PDCCH, and,
upon reception of the third PDCCH from the controller, the decoder does not perform selection on the signals to be transmitted by the signal transmitter.

5. The reducing power consumption wireless communication system according to claim 2, wherein:
the controller determines whether the data amount to be transmitted to the mobile station measured by the buffer controller is equal to or smaller than a predetermined value,
when the result of the determination indicates that the data amount to be transmitted to the mobile station is equal to or smaller than the predetermined value, the controller notifies the mobile station that the data amount to be transmitted to the mobile station is equal to or smaller than the predetermined value,
when a data increase is measured by the buffer controller, the controller notifies the mobile station of arrival of data,
the decoder receives the signals transmitted by the signal transmitter without performing selection on the signals transmitted by the signal transmitter during a predetermined time in a third predetermined period,
when the notification that the data amount to be transmitted to the mobile station by the base station is equal to or smaller than the predetermined value is received from the controller and the predetermined time expires, the decoder selects a second predetermined format from among the signal formats to be used for decoding the signals to be transmitted by the signal transmitter,
when the notification of data arrival is received from the controller and the predetermined time in the third predetermined period has come, the decoder does not perform selection on the signals to be transmitted by the signal transmitter.

6. A mobile station comprising:
a decoder configured to:
  perform intermittent reception at predetermined intervals without performing selection on signals to be transmitted by a base station which transmits the first PDCCH to the mobile station based on a data amount to be transmitted to the mobile station, and notify the mobile station of timer activation;
  when the timer has counted a first predetermined period and upon reception of the first PDCCH received from the base station, select a predetermined format to be decoded from among formats to be used for the signals to be transmitted by the base station, and detect a second PDCCH directed to the mobile station by decoding a received signal having the predetermined format among the signals received from the base station;
  when the timer has counted a second predetermined period, a downlink data communication is performed, and an intermittent reception period has not come, immediately start the intermittent reception and repeat the intermittent reception at the predetermined intervals; and
  when the intermittent reception period has come before the timer has counted the second predetermined period, start the intermittent reception after the timer has counted the second predetermined period and repeat the intermittent reception at the predetermined intervals; and
a signal processor configured to process the signal received from the base station based on the second PDCCH directed to the mobile station when the decoder detects the second PDCCH.

7. A base station comprising:
a signal transmitter configured to transmit a signal including a first PDCCH directed to a mobile station;
a buffer controller configured to measure a data amount in the base station to be transmitted to the mobile station; and
a controller configured to control transmission of the signal including the first PDCCH to the mobile station via the signal transmitter based on the data amount to be transmitted to the mobile station, the mobile station performing intermittent reception at predetermined intervals without performing selection on the signals to be transmitted by the signal transmitter, and activating a timer upon reception of a notification of the timer activation from the controller, when the timer has counted a first predetermined period and upon reception of the first PDCCH from the base station, selecting a predetermined format to be decoded from among formats to be used for the signals to be transmitted by the signal transmitter, and detecting a second PDCCH directed to the mobile station by decoding a received signal having the predetermined format among the signals received from the base station, when the timer has counted a second predetermined period, a downlink data communication is performed, and an intermittent reception period has not come, immediately starting the intermittent reception and repeating the intermittent reception at the predetermined intervals, and when the intermittent reception period has come before the timer has counted the second predetermined period, starting the intermittent reception after the timer has counted the second predetermined period and repeating the intermittent reception at the predetermined intervals, wherein
the first PDCCH reduces a number of signal format used for decoding by the mobile station.

8. A method of controlling a reducing power consumption wireless communication system that includes a mobile station and a base station, the method comprising:
causing the base station to:
  measure data amount in the base station to be transmitted to the mobile station;
  transmit a signal including a first PDCCH serving as a trigger to change a decoding process to the mobile station based on the data amount; and
  notify the mobile station of timer activation; and
causing the mobile station to:
  perform intermittent reception at predetermined intervals without performing selection on signals to be transmitted by the base station, and activate a timer upon reception of a notification of the timer activation from the controller;
  when the timer has counted a first predetermined period and upon reception of the first PDCCH received from the base station, select a predetermined format to be decoded from among formats to be used for the signals to be transmitted by the base station, and detect a second PDCCH directed to the mobile station by decoding a received signal having the predetermined format among the signals received from the base station;
  when the timer has counted a second predetermined period, a downlink data communication is performed, and an intermittent reception period has not come, immediately start the intermittent reception and repeat the intermittent reception at the predetermined intervals; and
  when the intermittent reception period has come before the timer has counted the second predetermined period, start the intermittent reception after the timer has counted the second predetermined period and repeat the intermittent reception at the predetermined intervals.

9. A method of controlling a reducing power consumption wireless communication system that includes a mobile station and a base station, the method comprising:
causing the base station to:
  measure data amount in the base station to be transmitted to the mobile station;
  transmit a signal including a first PDCCH serving as a trigger to reduce a number of signal formats to be decoded by the mobile station based on the data amount; and
  notify the mobile station of timer activation; and
causing the mobile station to:
  perform intermittent reception at predetermined intervals without performing selection on signals to be transmitted by the base station, and activate a timer upon reception of a notification of the timer activation from the controller,
  when the timer has counted a first predetermined period and upon reception of the first PDCCH received from the base station, detect a second PDCCH directed to the mobile station by decoding the signals received from the base station;
  when the timer has counted a second predetermined period, a downlink data communication is performed, and an intermittent reception period has not come, immediately start the intermittent reception and repeat the intermittent reception at the predetermined intervals; and when the intermittent reception period has come before the timer has counted the second predetermined period, start the intermittent reception after the timer has counted the second predetermined period and repeat the intermittent reception at the predetermined intervals.

* * * * *